United States Patent
Nagatomo

(10) Patent No.: US 8,818,801 B2
(45) Date of Patent: Aug. 26, 2014

(54) DIALOGUE SPEECH RECOGNITION SYSTEM, DIALOGUE SPEECH RECOGNITION METHOD, AND RECORDING MEDIUM FOR STORING DIALOGUE SPEECH RECOGNITION PROGRAM

(75) Inventor: Kentaro Nagatomo, Tokyo (JP)

(73) Assignee: NEC Corporation, Tokyo (JP)

( * ) Notice: Subject to any disclaimer, the term of this patent is extended or adjusted under 35 U.S.C. 154(b) by 873 days.

(21) Appl. No.: 12/737,582

(22) PCT Filed: May 12, 2009

(86) PCT No.: PCT/JP2009/002062
§ 371 (c)(1),
(2), (4) Date: Jan. 26, 2011

(87) PCT Pub. No.: WO2010/013371
PCT Pub. Date: Feb. 4, 2010

(65) Prior Publication Data
US 2011/0131042 A1    Jun. 2, 2011

(30) Foreign Application Priority Data
Jul. 28, 2008  (JP) ................................ 2008-193755

(51) Int. Cl.
*G10L 15/00* (2013.01)

(52) U.S. Cl.
USPC ........... 704/231; 704/235; 704/251; 704/255; 704/240; 704/246

(58) Field of Classification Search
CPC ....... G10L 15/00; G10L 15/18; G10L 15/183; G10L 15/19; G10L 15/193; G10L 15/197; G10L 15/26; G10L 15/28
USPC .......... 704/231, 235, 236, 251, 255, 240, 246
See application file for complete search history.

(56) References Cited

U.S. PATENT DOCUMENTS

2004/0030550 A1* 2/2004 Liu et al. ................ 704/231
2004/0249637 A1* 12/2004 Baker .................... 704/239

(Continued)

FOREIGN PATENT DOCUMENTS

| JP | 7-104786 A | 4/1995 |
| JP | 2003-228393 A | 8/2003 |

(Continued)

OTHER PUBLICATIONS

A. Lee, T. Kawahara and K. Shikano."Julius—an open source real-time large vocabulary recognition engine." In Proc. European Conference on Speech Communication and Technology (EUROSPEECH), pp. 1691-1694, 2001.

(Continued)

*Primary Examiner* — Qi Han
(74) *Attorney, Agent, or Firm* — McGinn IP Law Group, PLLC

(57) ABSTRACT

Disclosed is a dialogue speech recognition system that can expand the scope of applications by employing a universal dialogue structure as the condition for speech recognition of dialogue speech between persons. An acoustic likelihood computation means (701) provides a likelihood that a speech signal input from a given phoneme sequence will occur. A linguistic likelihood computation means (702) provides a likelihood that a given word sequence will occur. A maximum likelihood candidate search means (703) uses the likelihoods provided by the acoustic likelihood computation means and the linguistic likelihood computation means to provide a word sequence with the maximum likelihood of occurring from a speech signal. Further, the linguistic likelihood computation means (702) provides different linguistic likelihoods when the speaker who generated the acoustic signal input to the speech recognition means does and does not have the turn to speak.

13 Claims, 7 Drawing Sheets

(56) References Cited

U.S. PATENT DOCUMENTS

| | | | |
|---|---|---|---|
| 2005/0143994 A1* | 6/2005 | Mori et al. | 704/235 |
| 2005/0171926 A1 | 8/2005 | Thione et al. | |
| 2009/0204620 A1 | 8/2009 | Thione et al. | |
| 2009/0271195 A1 | 10/2009 | Kitade et al. | |

FOREIGN PATENT DOCUMENTS

| | | | |
|---|---|---|---|
| JP | 2005-215689 A | 8/2005 |
| WO | WO 2008/004666 A1 | 1/2008 |

OTHER PUBLICATIONS

Sako and Ariki, "Structuring Baseball Live Game Based on Knowledge Dependent Speech Recognition", The 6th Symposium on Spoken Language, The Institute of Electronics, Information and Communication Engineers, SP2004-136, pp. 85-90, Dec. 2004.

Yoko Nakai, "An Analysis of Verbal/Non-verbal Turn-taking Signals" [online], [searched on May 14, 2008], Internet <http://dspace.wul.waseda.ac.jp/dspace/bitstream/2065/3513/1/34029.pdf>.

* cited by examiner

DIALOGUE SPEECH RECOGNITION SYSTEM, DIALOGUE SPEECH RECOGNITION METHOD, AND RECORDING MEDIUM FOR STORING DIALOGUE SPEECH RECOGNITION PROGRAM

TECHNICAL FIELD

The present invention relates to a dialogue speech recognition system, a dialogue speech recognition method, and a recording medium for storing a dialogue speech recognition program, and, particularly, to a dialogue speech recognition system, a dialogue speech recognition method, and a recording medium for storing a dialogue speech recognition program having the function to improve speech recognition accuracy for a dialogue in which a plurality of speakers can speak at the same time.

BACKGROUND ART

In recent years, the range of applications of speech recognition technology is on the rise, and "dialogue speech recognition" technology which converts a speech dialogue between persons into text is included therein. The "dialogue" or "speech dialogue" referred to herein indicates person-to-person information exchange by speech, and it is different from technology of person-to-machine "dialogic" interaction using speech.

From the viewpoint of basic technology, there is no significant difference between dialogue speech recognition and large vocabulary continuous speech recognition. Specifically, after, upon input of a speech waveform, cutting out a speech interval therefrom and extracting a speech feature quantity such as cepstrum, conversion from the feature quantity to a phoneme and conversion from the phoneme to a character sequence (word sequence) are performed simultaneously, and a conversion result with the maximum likelihood is output as text. In general, a set of conversion likelihoods from a feature quantity to a phoneme is called an acoustic model, and a set of conversion likelihoods from a phoneme to a character sequence (word sequence) is called a linguistic model.

The likelihood of the occurrence of a certain word sequence W in response to an input speech signal X is given by the following equation (1).

$$P(W|X) = P(X|W)P(W)P(X) \quad \text{Equation (1)}$$

Because speech recognition processing is processing for obtaining a word sequence W' with the maximum likelihood for an input speech, it can be represented as the following equation (2).

$$\begin{aligned} W' &= \mathrm{argmax} P(W \mid X) \\ &= P(X \mid W) P(W) \end{aligned} \quad \text{Equation (2)}$$

P(X|W) is given by the acoustic model, and P(W) is given by the linguistic model. Because an enormous amount of calculations is required to obtain the likelihoods of all word sequences W, P(X|W) is generally processed by being divided into units of phonemes. Further, various approximate calculations are used also for P(W). A representative example is N-gram language model. When the word sequence W consists of $w_1, w_2, w_3, \ldots, w_k$, the probability of occurrence P(W) is as the following equation (3), and therefore the number of parameters which act on the likelihood calculation increases as the word sequence becomes longer.

$$P(W) = p(w_1)p(w_2|w_1)p(w_3|w_1,w_2)\ldots p(w_k|w_1, w_2, \ldots, w_{k-1}) \quad \text{Equation (3)}$$

This is approximated as follows so as to refer to the nearest (N−1) word of a certain word.

$$P(W) \sim p(w_1)p(w_2|w_1)p(w_3|w_1,w_2)\ldots p(w_k|w_{k-n+1}, \ldots, w_{k-1})$$

Generally, a speech recognition program attains higher speed by not performing hypothetical calculation with a low likelihood. For example, in Non Patent Literature 1, beam search algorithm is used. The algorithm excludes word sequence candidates which are obtained at the time point of processing an input speech halfway through and whose likelihood up to that time point do not satisfy a given threshold from candidates for search. Further, higher speed can be attained also by reducing the number of word sequences or acoustic hypotheses to serve as calculation targets. For example, when it is known that speech related to politics is input, only the word sequence related to politics may be evaluated, and the word sequence related to comics may be excluded. A similar effect can be obtained by giving a linguistic model in which the likelihood for the latter becomes extremely low, not by completely excluding them from calculation. Further, as another example, when it is known that a speaker is male, it is not necessary to obtain the acoustic likelihood for a female voice, and the amount of calculations can be reduced. Such reduction of calculation targets, when done appropriately, contributes not only to an increase in speed but also to improvement of recognition accuracy. In this specification, appropriately reducing calculation targets is represented as "placing a condition" in some cases below.

The key point for improving the accuracy of speech recognition technology is to predict the content of input speech and appropriately place a condition that reflects the same on a speech recognition process. For example, when a speaker is identified, an acoustic model according to the speaker may be used as the condition. When a topic of the content of utterance is identified, recognition accuracy is improved by using a linguistic model according to the topic as the condition. When a plurality of speakers speak, an acoustic model may be switched by detecting a change of speakers in some way. When a plurality of topics are presented in turn during utterance, a linguistic model may be switched according to a change of topics. Examples of such techniques are described in Non Patent Literature 2 and Patent Literature 1.

In Non Patent Literature 2, a system that recognizes speech in "baseball live coverage" is described. Because an announcer, which is a speaker, becomes excited or quiet according to the situation of a game, an acoustic feature is not constant even with the same speaker, which causes degradation of speech recognition accuracy. Further, the property that confusion of acoustically similar words such as "Hanshin" and "Sanshin" (strikeout) is likely to occur is found. In view of this, in the speech recognition system described in Non Patent Literature 2, the baseball coverage is structured using the progress (status) of a game such as "whether the count is two strikes or not". Then, in the speech recognition system described in Non Patent Literature 2, the progression of the status is predicted, and speech recognition is performed by appropriately switching an acoustic model (a usual state model or an excited state model) or a linguistic model (models prepared separately for each stroke count) dependent on the status.

In Patent Literature 1, a speech dialog system that searches for information with person-to-machine dialogic interaction is described. The system described in Patent Literature 1 prompts a user to input certain information next, and therefore the content of the next utterance can be predicated to a certain degree as long as the user follows it. With use of this, a linguistic model is switched according to the question presented to the user.

The techniques to improve speech recognition accuracy described in Non Patent Literature 2, Patent Literature 1 and the like can be applied also to the case of a dialogue speech to a certain degree. However, the dialogue speech has features not found in the speech at which the exemplified speech recognition targets.

A first feature of the dialogue speech is that there is a possibility that a plurality of speakers speak at the same time. Because general speech recognition technology is developed on the assumption of a single speaker, such speech cannot be recognized as it is.

For example, in the case of TV program speech, although speech can be recognized without difficulty in a scene where people speak one by one in turns, speech cannot be recognized in a scene where a plurality of people intensely quarrel with one another. A news show is an example of the former, and a variety show is an example of the latter. This is part of the reason that recognition technology for a variety show is immature today while news speech recognition is putting to practical use. When some measures can be taken at the stage of recording, a method that prepares a plurality of microphones and records the speech of one speaker per microphone as a general rule may be used. If the speech of one speaker is recorded by one microphone, even when a plurality of speakers speak at the same time, only the speech of a speaker is included in each recorded speech, so that the issue can be prevented.

A second feature of the dialogue speech is to have the property that a speaker of dialogue speech speaks within the range that a person who is a listener can hear, without consideration of the existence of a speech recognition system. This leads to degradation of the recognition accuracy of the speech recognition system.

When a speaker takes the existence of the speech recognition system into consideration, it is expected that the content of utterance can be controlled so that the system can easily recognize it. For example, when extremely rapid speech, small voice, muffled voice or the like is input, it can be prompted to speak again, and it is relatively easy to predict the next content of utterance as in the technique of Patent Literature 1. The system can earn recognition accuracy by placing a condition specialized to such utterance "controlled to fit the system".

On the other hand, in "speech for a person" such as dialogue speech, because it is only necessary that a person who is a listener can understand, utterance which is unfavorable for the speech recognition system is made often. Although it is prompted to speak again when it is unfavorable also for a person who is a listener such as rapid speech or small voice as described above, phonological distortion due to speaker's feeling, distortion, abbreviation or the like of utterance of a phrase which is unnecessary for communication of a main intention often does not matter to a human listener, and they are input to the dialogue speech recognition system in an unchanged state. As an example of the phonological distortion due to speaker's feeling, the frequency of utterance in an excited state is higher than that of utterance in a usual state. Further, as an example of the distortion and abbreviation of utterance of a phrase which is unnecessary for communication of a main intention, " . . . desu" is abbreviated as " . . . su", uttered very weakly and quickly, or linguistically eliminated.

Further, in the field of linguistics, a dialogue between two speakers is described as "a sequence of talks like A-B-A-B-A-B between two participants, where a participant A speaks and finishes speaking, and then another participant B speaks and finishes speaking" (c.f. Non Patent Literature 3). Thus, a dialogue is considered to have a basic structure of repeating "turn-shifting" or "turn-taking". This structure is expandable as it is when there are three or more dialogue participants.

Although a person who mainly speaks in a speech dialogue is a speaker who has the turn to speak, there is a possibility that a speaker who does not have the turn to speak also speaks. According to Sacks, it is described that "in transitions from one turn to next turn, neither gap nor overlap usually occurs, and if any, it is short, and there is a general rule that basically one participant takes one turn and speaks" (cf. Non Patent Literature 3).

CITATION LIST

Patent Literature 1

Japanese Unexamined Patent Application Publication No. 7-104786

Non Patent Literature 1

A. Lee, T. Kawahara and K. Shikano. "Julius—an open source real-time large vocabulary recognition engine." In Proc. European Conference on Speech Communication and Technology (EUROSPEECH), pp. 1691-1694, 2001.

Non Patent Literature 2

Sako and Ariki, "Structuring Baseball Live Game Based on Knowledge Dependent Speech Recognition", The 6th Symposium on Spoken Language, The Institute of Electronics, Information and Communication Engineers, SP2004-136, pp. 85-90, 2004-12

Non Patent Literature 3

Yoko Nakai, "An Analysis of Verbal/Non-verbal Turn-taking Signals" [online], [searched on May 14, 2008], Internet <http://dspace.wul.waseda.ac.jp/dspace/bitstream/2065/3513/1/34029.pdf>

SUMMARY OF INVENTION

Technical Problem

A first problem is that, when placing a condition on speech recognition processing by using some structure of dialogue speech, a conditioning method using a general structure which is applicable to any speech dialog has not existed. This is because the structures used in the techniques described in Non Patent Literature 2 and Patent Literature 1 are very limited, and the structure is applicable to some speech dialogs but not applicable to others.

Although the idea that a dialog has some kind of structure is propounded often, what the structural component is tends to be determined in specialization to an issue focused by a propounder. For example, in the case of the technique disclosed in Non Patent Literature 2, the issue focused by a propounder is "baseball coverage", and the dialogue component is a concept that is present only in baseball, such as "strike count". It is thus obvious that the dialogue component is not applicable to sports different from baseball. Further, it is also obvious that it is not applicable to coverage speech different from sports and video speech.

Further, in the case of the technique disclosed in Patent Literature 1, the structure of a dialog is determined by what the system asks next. In Patent Literature 1, it is described that "upon selection of a statistic language model, it is necessary to set a situation in which the speech dialog system can predict user utterance. The situation in which user utterance is predictable may be a dialog start and end situation, a situation in which the system asks some question, i.e. a situation in which an answer to the question of the system is obtained from a user or the like", and "situation of asking a name", "situation of asking when", "situation of asking what", and "situation of asking where" are exemplified as specific situations. As a matter of course, when the system asks a different question from those, a "situation" in accordance with it should be assumed. Further, in an application in which the system cannot control a dialogue flow, the technique described in Patent Literature 1 cannot be used. The dialogue speech, which is a target of the dialogue speech recognition, just corresponds to the application in which "a flow is not controllable".

As described above, the techniques described in Non Patent Literature 2 and Patent Literature 1 use the structure or the dialog component which can be used in applications that satisfy certain limited conditions but cannot be used in other applications. With use of such a dialog component, an appropriate condition cannot be placed on a speech dialog which does not satisfy the above conditions, thus not leading to improvement of speech recognition accuracy.

In order to appropriately use the techniques described in Non Patent Literature 2 and the like, it has been necessary for a speech recognition system designer to begin with analyzing the content of input speech utterance and finding some structure dependent on the content. Such work is complicated and an appropriate structure cannot always be found.

A second problem is that a phenomenon in which a plurality of speakers can speak at the same time (overlapping utterance) is disregarded on purpose. This is because it is based on the technology that recognizes the speech of one speaker. Further, in the case of a scheme that allocates a different channel (microphone) to each speaker as well, overlapping utterance is disregarded in the sense of separately processing the speech of one speaker in the end.

In light of the foregoing, the present invention aims to provide a dialogue speech recognition system, a dialogue speech recognition method, and a recording medium for storing a dialogue speech recognition program which use a universal dialogue structure as a condition when performing speech recognition of dialogue speech between persons to thereby enlarge the scope of application. Further, the present invention aims to provide a dialogue speech recognition system, a dialogue speech recognition method, and a recording medium for storing a dialogue speech recognition program which make appropriate use of the overlapping utterance appearing in dialogue speech to thereby enhance accuracy.

Solution to Problem

According to the present invention, there is provided a dialogue speech recognition system that includes a speech recognition means that receives a speech signal of each speaker in a dialog among a plurality of speakers and turn information indicating whether a speaker having generated the speech signal has turn to speak or indicating a probability that the speaker has turn to speak and performs speech recognition for the speech signal, wherein the speech recognition means at least includes an acoustic likelihood computation means that provides a likelihood of occurrence of an input speech signal from a given phoneme sequence, a linguistic likelihood computation means that provides a likelihood of occurrence of a given word sequence, and a maximum likelihood candidate search means that provides a word sequence with a maximum likelihood of occurrence from a speech signal by using the likelihoods provided by the acoustic likelihood computation means and the linguistic likelihood computation means, and the linguistic likelihood computation means provides different linguistic likelihoods when a speaker having generated a speech signal input to the speech recognition means has the turn to speak and when not.

According to the present invention, there is provided a dialogue speech recognition method that includes, upon receiving a speech signal of each speaker in a dialog among a plurality of speakers and turn information indicating whether a speaker having generated the speech signal has turn to speak or indicating a probability that the speaker has turn to speak, performing speech recognition for the speech signal, at time of the speech recognition, performing acoustic likelihood computation that provides a likelihood of occurrence of an input speech signal from a given phoneme sequence, performing linguistic likelihood computation that provides a likelihood of occurrence of a given word sequence, performing maximum likelihood candidate search that provides a word sequence with a maximum likelihood of occurrence from a speech signal by using the likelihoods provided by the acoustic likelihood computation and the linguistic likelihood computation, and, at time of the linguistic likelihood computation, providing different linguistic likelihoods when a speaker having generated an input speech signal has the turn to speak and when not.

According to the present invention, there is provided a storage medium for storing a dialogue speech recognition program that causes a computer to execute speech recognition processing that, upon receiving a speech signal of each speaker in a dialog among a plurality of speakers and turn information indicating whether a speaker having generated the speech signal has turn to speak or indicating a probability that the speaker has turn to speak, performs speech recognition for the speech signal, wherein the speech recognition processing at least includes acoustic likelihood computation processing that provides a likelihood of occurrence of an input speech signal from a given phoneme sequence, linguistic likelihood computation processing that provides a likelihood of occurrence of a given word sequence, and maximum likelihood candidate search processing that provides a word sequence with a maximum likelihood of occurrence from a speech signal by using the likelihoods provided by the acoustic likelihood computation processing and the linguistic likelihood computation processing, and the linguistic likelihood computation processing provides different linguistic likelihoods when a speaker having generated the speech signal input to the speech recognition means has the turn to speak and when not.

Advantageous Effects of Invention

According to the present invention, because speech recognition is performed using the condition where a speaker has the turn to speak and the condition where a speaker does not have the turn to speak with utilization of the turn to speak, which is a universal concept in a dialogue, it is thus applicable

DESCRIPTION OF EMBODIMENTS

Hereinafter, embodiments of the present invention are described with reference to the drawings.

First Embodiment

Figure 1:
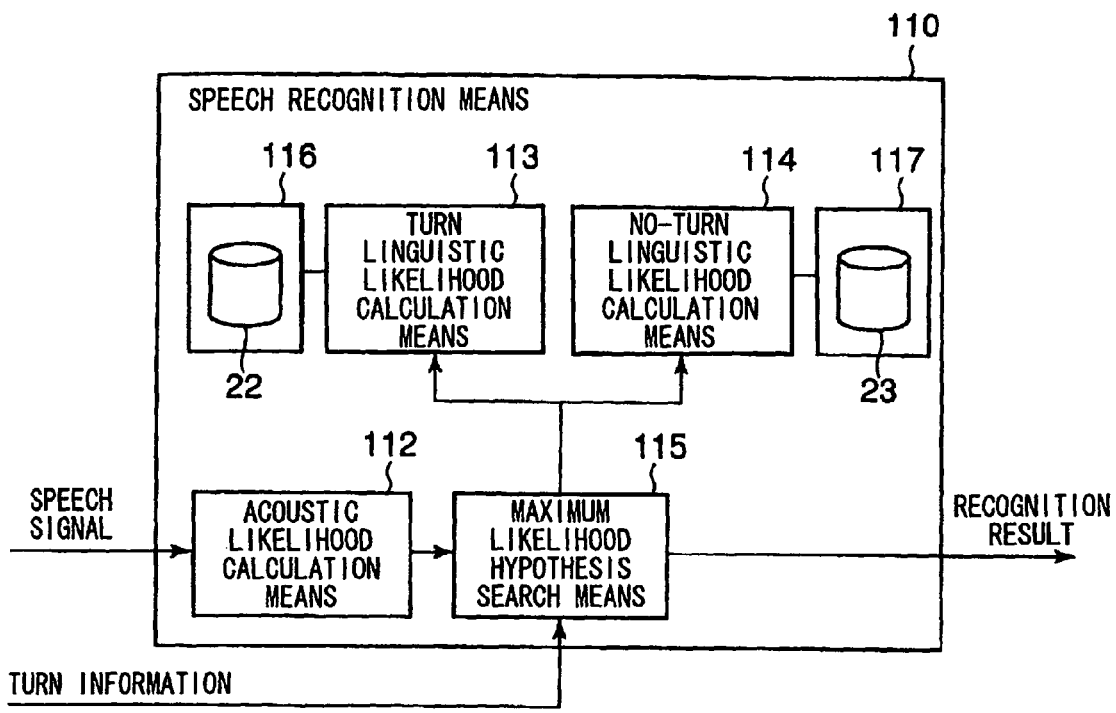
FIG. 1 is a block diagram showing a configuration example of a first embodiment of the present invention.

FIG. 1 is a block diagram showing a configuration example of a first embodiment of the present invention. A dialogue speech recognition system according to the present invention includes a speech recognition means 110. The speech recognition means 110 includes an acoustic likelihood calculation means 112, a turn linguistic likelihood calculation means 113, a no-turn linguistic likelihood calculation means 114, a maximum likelihood hypothesis search means 115, a turn linguistic model storage means 116, and a no-turn linguistic model storage means 117. A speech signal and turn information are input to the speech recognition means 110, and the speech recognition means 110 outputs a speech recognition result for the speech signal. The turn information is described later.

A speech signal, which is a target of recognition, is input to the acoustic likelihood calculation means 112. The acoustic likelihood calculation means 112 extracts a speech feature quantity for each frame (short time interval) from the input speech signal. An example of the speech feature quantity extracted by the acoustic likelihood calculation means 112 includes a power or cepstrum of input speech (input speech signal), though another speech feature quantity may be extracted. The acoustic likelihood calculation means 112 compares the extracted speech feature quantity with a given acoustic model and calculates a likelihood (acoustic likelihood) that the speech signal appearing in each frame corresponds to each phoneme. Note that the speech recognition means 110 may include an acoustic model storage means (not shown) that stores an acoustic model, and the acoustic likelihood calculation means 112 may refer to the acoustic mode.

Further, the acoustic model is information that associates a speech feature quantity, each phoneme, and likelihood (acoustic likelihood) that the speech feature quantity is converted to each phoneme.

The maximum likelihood hypothesis search means 115 refers to the acoustic likelihood calculated by the acoustic likelihood calculation means 112 and a linguistic likelihood given by the turn linguistic likelihood calculation means 113 or the no-turn linguistic likelihood calculation means 114 and retrieves text with the maximum likelihood (the total of the acoustic likelihood and the linguistic likelihood) as a recognition result of the input speech signal. The linguistic likelihood is a likelihood that a phoneme sequence forms a character sequence. The character sequence converted from the phoneme sequence may be a character or a word, or a chain of characters or words. The linguistic likelihood may be a likelihood in the case where part of words constituting the chain of characters or words belongs to a set (class, which is described later) of words defined to have a similar distribution of appearance.

Further, turn information which indicates whether a speaker who generated an input speech signal has the turn to speak or indicates a probability that the speaker has the turn to speak is input to the maximum likelihood hypothesis search means 115. The turn to speak is a right to preferentially continue speaking without interruption by others as a general rule. The turn to speak is a classic concept in the field of linguistics. Hereinafter, the case where the turn information which represents whether a speaker has the turn to speak or not by a binary value such as 0/1 is input is described by way of illustration. Note that the case of using the turn information which represents a probability of having the turn to speak in a stochastic manner, not by a binary value, is described later.

The maximum likelihood hypothesis search means 115 switches between the turn linguistic likelihood calculation means 113 and the no-turn linguistic likelihood calculation means 114 as a means from which a linguistic likelihood is obtained, depending on whether a speaker of an input speech signal has the turn to speak or not. Specifically, when it is determined from the turn information that the speaker of the input speech signal has the turn to speak, the linguistic likelihood is obtained from the turn linguistic likelihood calculation means 113. Further, when it is determined from the turn information that the speaker of the input speech signal does not have the turn to speak, the linguistic likelihood is obtained from the no-turn linguistic likelihood calculation means 114.

The maximum likelihood hypothesis search means 115 acquires a speech recognition result based on the likelihood (the total of the acoustic likelihood and the linguistic likelihood) and outputs the speech recognition result. For example, the maximum likelihood hypothesis search means 115 may output text with the maximum likelihood. Further, the maximum likelihood hypothesis search means 115 may output text of top N ranks in descending order of the likelihood as the speech recognition result. Further, the maximum likelihood hypothesis search means 115 may output a graph structure (which is generally called a lattice) made up of the whole or part of a hypothetical space containing those as the recognition result.

Further, the turn linguistic model storage means 116 is a storage means that stores a turn linguistic model 22, and the no-turn linguistic model storage means 117 is a storage means that stores a no-turn linguistic model 23. The respective linguistic models 22 and 23 may be constructed as information that associates a phoneme sequence, a character sequence corresponding to the phoneme sequence, and a likelihood that the phoneme sequence is converted to the character sequence. Note that, however, the turn linguistic model is a linguistic model for a speaker having the turn to speak, and the no-turn linguistic model is a linguistic model for a speaker not having the turn to speak. The turn linguistic model 22 is a linguistic model learned from utterance of a speaker having the turn to speak, and the no-turn linguistic model 23 is a linguistic model learned only from utterance (back-channel, confirmation or request for turn to speak) of a speaker not having the turn to speak.

Note that an aspect that the linguistic models 22 and 23 are stored into the storage means 116 and 117, respectively, is not particularly limited. For example, the turn linguistic model storage means 116 may be a memory that stores the turn linguistic model 22. Further, the turn linguistic model 22 may be stored in file format. The same applies to the no-turn linguistic model 23.

The turn linguistic likelihood calculation means 113 and the no-turn linguistic likelihood calculation means 114 send the character sequence corresponding to the phoneme sequence specified by the maximum likelihood hypothesis search means 115 and the likelihood that the specified phoneme sequence is converted to the character sequence back to the maximum likelihood hypothesis search means 115. Note that, however, the turn linguistic likelihood calculation means 113 sends the likelihood of the character sequence corresponding to the specified phoneme sequence back to the maximum likelihood hypothesis search means 115 by referring to the turn linguistic model 22. Further, the no-turn linguistic likelihood calculation means 114 sends the likelihood of the character sequence corresponding to the specified phoneme sequence back to the maximum likelihood hypothesis search means 115 by referring to the no-turn linguistic model 23.

The acoustic likelihood calculation means 112, the turn linguistic likelihood calculation means 113, the no-turn linguistic likelihood calculation means 114, and the maximum likelihood hypothesis search means 115 are implemented by a CPU that operates according to a program (dialogue speech recognition program), for example. In this case, the program may be provided by being stored in a storage medium or provided by being transmitted over a communication medium such as the Internet. Further, the storage medium includes a flexible disk, hard disk, magnetic disk, magneto-optical disk, CD-ROM, DVD, ROM cartridge, RAM memory cartridge with battery backup, flash memory cartridge, nonvolatile RAM cartridge or the like. Further, the communication medium includes a wired communication medium such as a telephone line, a wireless communication medium such as a microwave line or the like. Then, the CPU may load a program from the recording medium and operate as the acoustic likelihood calculation means 112, the turn linguistic likelihood calculation means 113, the no-turn linguistic likelihood calculation means 114, and the maximum likelihood hypothesis search means 115 according to the program. Further, the acoustic likelihood calculation means 112, the turn linguistic likelihood calculation means 113, the no-turn linguistic likelihood calculation means 114, and the maximum likelihood hypothesis search means 115 may be implemented by separate circuits.

The operation is described hereinbelow.

First, a pair of a speech signal and turn information corresponding to the speech signal are input to the speech recognition means 110. The speech signal is input to the acoustic likelihood calculation means 112, and the turn information is input to the maximum likelihood hypothesis search means 115.

The acoustic likelihood calculation means 112 extracts a speech feature quantity for each frame from the speech signal according to a prescribed procedure. The acoustic likelihood calculation means 112 compares, the extracted feature quantity with the acoustic model, calculates a likelihood (acoustic likelihood) that the feature quantity is converted to each phoneme, and outputs the likelihood to the maximum likelihood hypothesis search means 115.

Further, the maximum likelihood hypothesis search means 115 selects the turn linguistic likelihood calculation means 113 or the no-turn linguistic likelihood calculation means 114 according to the input turn information. Specifically, the maximum likelihood hypothesis search means 115 selects the turn linguistic likelihood calculation means 113 when the turn information indicates that the speaker of the speech signal has the turn to speak, and it selects the no-turn linguistic likelihood calculation means 114 when the turn information indicates that the speaker of the speech signal does not have the turn to speak. Although the case where the turn linguistic likelihood calculation means 113 is selected is described herein by way of illustration, the same applies to the case where the no-turn linguistic likelihood calculation means 114 is selected. The maximum likelihood hypothesis search means 115 specifies a phoneme sequence in which the respective phonemes for which the acoustic likelihoods have been obtained in each frame are arranged in order of time, and makes a request for a character sequence corresponding to the phoneme sequence and its linguistic likelihood to the selected turn linguistic likelihood calculation means 113. In response to the request, the selected turn linguistic likelihood calculation means 113 calculates each character sequence corresponding to the phoneme sequence and its linguistic likelihood.

The number of candidates for the character sequence to be converted from the phoneme sequence is not limited to one, and the turn linguistic likelihood calculation means 113 and the no-turn linguistic likelihood calculation means 114 calculate the linguistic likelihood for each character sequence as a candidate for conversion of the phoneme sequence.

The maximum likelihood hypothesis search means 115 refers to the acoustic likelihood output from the acoustic likelihood calculation means 112 and the linguistic likelihood provided by the turn linguistic likelihood calculation means 113 or the no-turn linguistic likelihood calculation means 114 and searches for text with the maximum likelihood (the total of the acoustic likelihood and the linguistic likelihood) as a recognition result of the input speech signal. The maximum likelihood hypothesis search means 115 continues search for text by switching between the turn linguistic likelihood calculation means 113 and the no-turn linguistic likelihood calculation means 114 according to the value of the turn information.

As described earlier, the maximum likelihood hypothesis search means 115 may output text with the maximum likelihood as the speech recognition result or may output text of top N ranks in descending order of the likelihood as the speech recognition result. Alternatively, the maximum likelihood hypothesis search means 115 may output a graph structure (lattice) made up of the whole or part of a hypothetical space containing those as the speech recognition result.

The maximum likelihood hypothesis search means 115 calculates the sum total of the acoustic likelihood and the linguistic likelihood with respect to each conversion candidate in each phoneme sequence. Then, the character sequence with the greatest total value, for example, may be output as the speech recognition result.

As the linguistic likelihood, the probability of appearance of a word chain may be used. Specifically, the linguistic model may be a statistical linguistic model which uses the probability of appearance of a word chain as the linguistic likelihood. For example, a linguistic model such as two-word chain (bigram) or three-word chain (trigram) is used often, and such a linguistic model may be used in the present invention as well. Further, although the probability of appearance of one-word chain, which is the word itself (unigram probability) may be used, it is preferred to use the two-word chain or the three-word chain in terms of expressiveness.

Further, the linguistic likelihood may be defined by a chain of sets of words with a similar distribution of appearance, rather than a chain of words themselves. Specifically, a class model may be used as the linguistic model. Further, a set regarding "parts of speech", "fluctuation of reading or description of the same word" or the like may be defined as a set equivalent to the class.

Further, as another way of providing the linguistic likelihood, a method that describes grammar which accepts an assumed input only with use of context-free grammar or the like and provides whether it is a word chain accepted by the grammar or not with 0/1 is often used (grammar-based language model). In the case where any of several typical terms is expected to be uttered, it is more convenient to use such a linguistic model, and such a linguistic mode may be used in the present invention.

In any way, they are common in that the linguistic model is constructed in advance according to the content of utterance of speech expected as a target of recognition and provided to the turn linguistic likelihood calculation means 113 and the no-turn linguistic likelihood calculation means 114.

As described earlier, speech recognition accuracy can be improved by placing a condition on the speech recognition process. The linguistic model is used to place a condition of the linguistic likelihood by modeling a linguistic bias of the content of utterance.

The bias of the content of utterance depending on the presence or absence of the turn to speak is described as follows. In the field of linguistics, such a structure is assumed that a person who has the turn to speak can preferentially speak for a length of time. On the other hand, a person who does not have the turn to speak can also speak in a limited fashion. A major example of such utterance includes back-channel, confirmation and request for turn to speak. Hereinafter, they are described one by one, taking specific examples.

The back-channel is utterance which is made so that a dialog participant who does not have the turn to speak expresses, for a speaker who has the turn to speak, that the participant is listening to the speaker and that the speaker can continue to hold the turn to speak. Therefore, it is only a speaker not having the turn to speak who makes a back-channel response. Specifically, particular words such as "Yeah", "Really", "Is that right?", "I get it" and "I see" are used.

Figure 2:
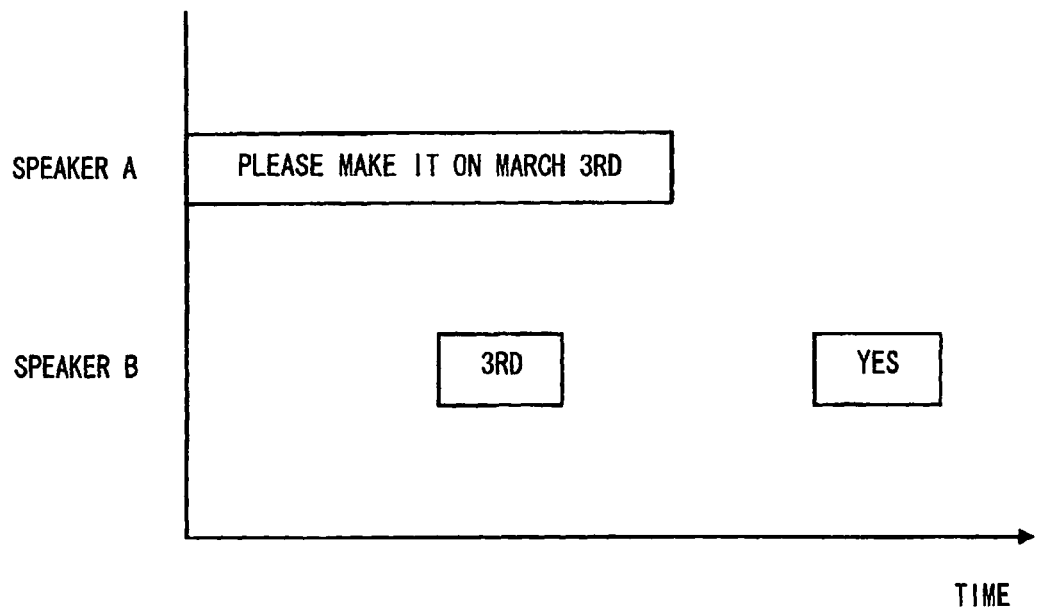
FIG. 2 is an explanatory view showing an example of a confirmation in a dialog.

The confirmation is utterance which is made so that a speaker who does not have the turn to speak requests a speaker who has the turn to speak to make corrective utterance if there is misunderstanding, and it is usually made by repeating part of the content of utterance. FIG. 2 is an explanatory view showing an example of confirmation in a Dialog. The example of FIG. 2 illustrates the situation in which a speaker B speaks without having the turn to speak in order to confirm the content of utterance of a speaker A who has the turn to speak. The horizontal axis in FIG. 2 represents a lapse of time and indicates the timing of the utterance "Please make is on march 3rd" of the speaker A and the utterance "3rd" and "Yes" of the speaker B.

The request for turn to speak is utterance which is made so that a speaker who does not have the turn to speak expresses intention to receive the next turn to speak. An easy-to-understand example is utterance ("Objection!" etc.) in the situation where a prosecutor or a lawyer at trial interposes an objection to an improper question of the other party. Besides, it may be made in the form of calling for a person who has the turn to speak at the point of time or a dialog participant who has a right to grant the turn to speak, such as "Chairman", "Hey", "Well" or "Excuse me".

In this manner, there is a bias between the content of utterance made only when not having the turn to speak and the utterance made when having the turn to speak. Thus, a configuration is employed in which the linguistic model learned from the utterance of a speaker who has the turn to speak and the linguistic model learned only from the utterance (back-channel, confirmation, request for turn to speak) of a speaker who does not have the turn to speak are constructed separately, and the turn linguistic likelihood calculation means 113 refers to the former, and the no-turn linguistic likelihood calculation means 114 refers to the latter.

It is assumed that turn information p is given by a binary value of 0/1, where 1 indicates the presence of the turn to speak, and 0 indicates the absence of the turn to speak. When a linguistic likelihood sent back from the no-turn linguistic likelihood calculation means 114 is $P_{1-\rho}$, and a linguistic likelihood sent back from the turn linguistic likelihood calculation means 113 is $P_\rho$, a linguistic likelihood P is represented by the following Equation (4).

$$P(w,\rho)=(1-\rho)P_{1-\rho}(w)+\rho P_\rho(w) \quad \text{Equation (4)}$$

Note that, in Equation (4), a character sequence to serve as a conversion candidate is w, and $P(w,\rho)$ on the left-hand side is a linguistic likelihood for w under the given turn information. Further, $P_{1-\rho}(w)$ and $P_\rho(w)$ on the right-hand side are linguistic likelihoods for w, respectively. In this manner, when representing a linguistic likelihood under a specific character sequence or turn information, the character sequence w or the turn information $\rho$ is shown in parenthesis after the symbol indicating the linguistic likelihood.

Further, the turn information may represent the probability that a speaker has the turn to speak in a stochastic manner, not by a binary value like 0/1. In the case where the turn information which represents the probability that a speaker has the turn to speak in a stochastic manner is input, the maximum likelihood hypothesis search means 115 may make a request for a linguistic likelihood to each of the turn linguistic likelihood calculation means 113 and the no-turn linguistic likelihood calculation means 114, and merge the linguistic likelihoods obtained by the turn linguistic likelihood calculation means 113 and the no-turn linguistic likelihood calculation means 114 by using a probability value indicated by the turn information. For example, the maximum likelihood hypothesis search means 115 may merge the linguistic likelihoods by linearly combining the linguistic likelihood obtained from the turn linguistic model and the linguistic likelihood obtained from the no-turn linguistic model according to the probability value indicated by the turn information.

For example, it is assumed that the respective words of a three-word chain (trigram) composed of a certain phoneme sequence for which a linguistic likelihood is to be calculated are represented as w1, w2 and w3. Further, the turn information is represented as $\rho$, and a probability of having the turn to speak is represented as $\lambda(\rho)$. At this time, the maximum likelihood hypothesis search means 115 may perform calculation represented by the following Equation (5) using the linguistic likelihood $P_\rho(w_1\ w_2\ w_3)$ obtained for $w_1\ w_2\ w_3$ by the turn linguistic likelihood calculation means 113 and the linguistic likelihood $P_{1-\rho}(w_1\ w_2\ w_3)$ obtained for $w_1\ w_2\ w_3$ by the no-turn linguistic likelihood calculation means 114, linearly combines them, and obtains the result as the linguistic likelihood for $w_1\ w_2\ w_3$ under the given turn information.

$$P(w_1w_2w_3,\rho)=(1-\lambda(\rho))P_{1-\rho}(w_1w_2w_3)+\lambda(\rho)P_\rho(w_1w_2w_3) \quad \text{Equation (5)}$$

In the process of deriving the linguistic likelihood, a bonus or penalty is applied (in other words, correction is made) to the linguistic likelihood obtained for the word chain ($w_1\ w_2\ w_3$) based on the turn linguistic model and the no-turn linguistic model according to the value $\lambda(\rho)$ indicated by the turn information. In this manner, a bonus or penalty may be applied to a linguistic likelihood regarding a word, a set of words, or a chain of them according to the turn information.

Further, the confirmation utterance has a property that it is made when not having the turn to speak, and a part of the content of the most recent utterance of a speaker having the turn to speak is repeated for confirmation. With utilization of such a property, at the time of speech recognition for speech of a speaker who does not have the turn to speak, a bonus or penalty may be applied to a linguistic likelihood of a character sequence corresponding to a speech recognition result for speech of a speaker who is determined to have the turn to speak at the most recent time according to the turn information. For example, when a speech recognition result for speech of a speaker who has the most recent turn to speak is a conversion candidate from a phoneme sequence, correction may be made to increase the linguistic likelihood of the conversion candidate obtained by referring to the no-turn linguistic model. Further, correction may be made to decrease the linguistic likelihood of the conversion candidate obtained by referring to the turn linguistic model.

For example, in the example shown in FIG. 2, it is assumed that the speech recognition results of "March" and "3rd" are obtained for the speech of the speaker A. Next, when calculating the linguistic likelihoods of them, correction may be made so that the linguistic likelihood $P_{1-\rho}$ of those words obtained by referring to the no-turn linguistic model is relatively higher as the probability of not having the turn to speak is higher.

In this case, if Equation (5) is expanded by reflecting the speech recognition result h with the recent turn to speak, an equation for linguistic likelihood calculation of the trigram language model is represented as the following Equation (6).

$$P(w_1w_2w_3,\rho,h)=(1-\lambda(\rho))P_{1-\rho}(w_1w_2w_3|h)+\lambda(\rho)P_\rho(w_1w_2w_3) \quad \text{Equation (6)}$$

Further, a bonus or penalty may be applied also to a linguistic likelihood of a character sequence which means back-channel, such as "Yes", "Uh huh" or "I see", in the same manner. For example, the back-channel "I see" which indicates agreement is likely to appear when not having the turn to speak, and the linguistic likelihood may be corrected to be higher for speech of a speaker who does not have the turn to speak. On the other hand, the linguistic likelihood of a word sequence containing "I see" may be corrected to be lower for speech of a speaker who has the turn to speak. Because construction of a linguistic model according to the presence or absence of the turn to speak takes costs, a bonus or penalty may be applied individually to a linguistic likelihood for characteristic words.

Although a word trigram language model is mainly described as an example above, basically the same applies to other language models.

Further, when generating the turn information, whether or not having the turn to speak may be automatically judged for generation. Alternatively, the turn information may be set manually. An example of automatically generating the turn information like the former includes an aspect in which the presence or absence of the turn to speak is estimated on the basis of utterance start time and end time. A specific example of this processing is described later in a third embodiment.

Further, the turn information may be automatically generated by tracing the looks of dialog participants by image recognition technology, detecting a movement of line of sight or a gesture such as pointing with a finger to thereby estimate the presence or absence of the turn to speak.

Further, in a formal dialog such as a conference, a dialog participant who is responsible for the giving and receiving of the turn to speak (chairman, chief judge etc.) exists. By utilizing this, when the dialog participant who is responsible for the giving and receiving of the turn to speak grants the turn to speak to a particular speaker, transfer of the turn to speak may be notified to the system (the speech recognition means 110; cf. FIG. 1) by pressing a button at the same time as when the speaker speaks.

Advantageous effects of this embodiment are described hereinbelow.

In this embodiment, by utilizing that there is a bias in the content of uttered speech depending on the presence or absence of the turn to speak, a linguistic likelihood is calculated by automatically selecting a linguistic model reflecting the bias according to whether a speaker has the turn to speak at the time of generating an input speech signal, and a recognition result with the maximum likelihood is searched for. It is thus possible to search for a hypothesis using a stronger condition, and it is expected to obtain a speech recognition result with higher accuracy.

Further, because a general dialog component, the turn to speak, which can be observed in almost every dialogue is used in the present invention, it is always available without a need for a system designer to set a dialogic structure in advance according to the assumed content of input speech. It is thereby possible to achieve speech recognition with high versatility which is applicable to any speech dialog.

As described in Non Patent Literature 3, utterance by a speaker who does not have the turn to speak, if any, is short. To be specific, the utterance is back-channel, confirmation, request for turn to speak or the like. Because the content of utterance is very limited, it functions as a linguistic condition to be used for speech recognition.

In the present invention, focusing on the turn to speak as a dialogic structure, conditions are switched according to the presence or absence of the turn to speak. It is thus applicable to any speech dialog and improve versatility as described above.

Further, according to the present invention, information of "overlapping utterance", which is specific to a speech dialog, can be used to improve speech recognition accuracy. Utterance by a speaker who does not have the turn to speak is one example of the case where "overlap occurs", which is exceptional in terms of the definition of Sack et al. which is cited as a reference in Non Patent Literature 3. Specifically, when a speaker who does not have the turn to speak makes utterance such as back-channel, the utterance overlaps with utterance of a speaker who has the turn to speak at that point of time. Conversely, when the overlapping utterance occurs, either utterance is made by a speaker who does not have the turn to speak. Therefore, by introducing the turn to speak as a condition at the time of speech recognition, it is possible to use the information of "overlapping utterance" to improve speech recognition accuracy.

Second Embodiment

Figure 3:
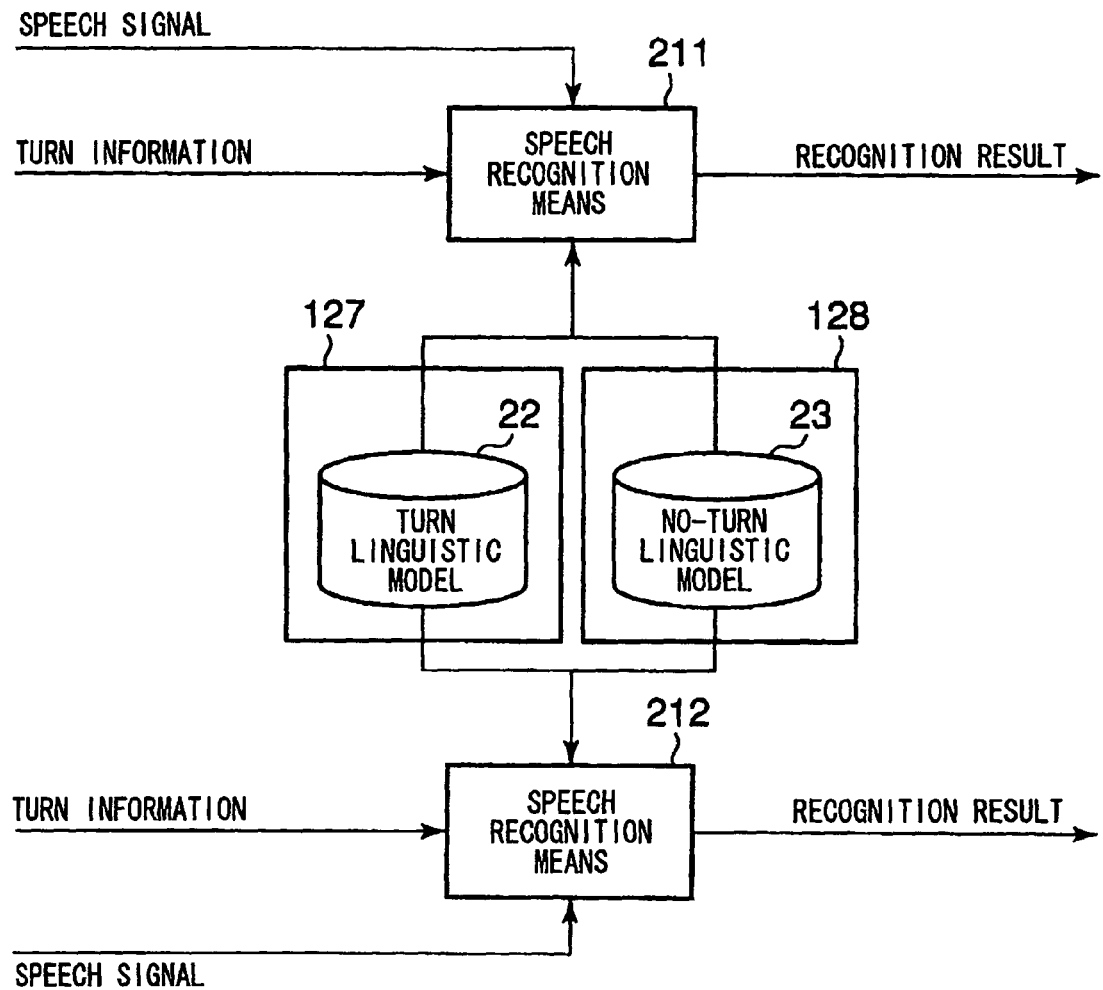
FIG. 3 is a block diagram showing a configuration example of a second embodiment of the present invention.

FIG. 3 is a block diagram showing a configuration example of a second embodiment of the present invention. A dialogue speech recognition system according to the second embodiment includes a first speech recognition means 211, a second speech recognition means 212, a turn linguistic model storage means 127, and a no-turn linguistic model storage means 128.

The turn linguistic model storage means 127 stores a turn linguistic model 22, and the no-turn linguistic model storage means 128 stores a no-turn linguistic model 23.

The first speech recognition means 211 and the second speech recognition means 212 both include an acoustic likelihood calculation means 112, a turn linguistic likelihood calculation means 113, a no-turn linguistic likelihood calculation means 114, and a maximum likelihood hypothesis search means 115, just like the speech recognition means 110 described in the first embodiment (cf. FIG. 1). However, in the second embodiment, the turn linguistic model storage means 127 and the no-turn linguistic model storage means 128 are shared between the first speech recognition means 211 and the second speech recognition means 212. Specifically, each of the speech recognition means 211 and 212 does not hold the turn linguistic model 22 and the no-turn linguistic model 23 in itself and shares the linguistic models 22 and 23. Then, the turn linguistic likelihood calculation means 113 (cf. FIG. 1) included in each of the speech recognition means 211 and 212 refers to the turn linguistic model 22 stored in the turn linguistic model storage means 127. Likewise, the no-turn linguistic likelihood calculation means 114 included in each of the speech recognition means 211 and 212 refers to the no-turn linguistic model 23 stored in the no-turn linguistic model storage means 128. As for the other points, the operation of each component of the speech recognition means 211 and 212 is the same as that in the first embodiment.

A pair of a speech signal and turn information corresponding to the speech signal is input to the first speech recognition means 211, just like the speech recognition means 110 in the first embodiment. Further, a pair of a speech signal and turn information, which is different from the pair input to the first speech recognition means 211, is input to the second speech recognition means 212. The speech signals input to the first speech recognition means 211 and the second speech recognition means 212 are speech signals which are generated in a single dialog in which two speakers participate, and the turn information indicates the turn to speak in the dialog. Specifically, the speech signal of one speaker is input to the first speech recognition means 211, and the speech signal of the other speaker is input to the second speech recognition means 212. Then, each of the speech recognition means 211 and 212 outputs a speech recognition result (e.g. text etc.) for each input speech signal.

Advantageous effects of the second embodiment are described hereinafter.

In the second embodiment, the speech and the turn information are input by assigning a separate channel to each of speakers who participate in a dialogue, and each of the speech recognition means 211 and 212 performs speech recognition by switching between the turn linguistic likelihood calculation means 113 and the no-turn linguistic likelihood calculation means 114 according to the turn to speak. It is therefore possible to improve dialogue speech recognition accuracy as in the first embodiment. Because the turn linguistic model 22 and the no-turn linguistic model 23 are shared by two channels (the two speech recognition means 211 and 212), it is possible to simplify the prior model construction work and save the use memory size during the execution of speech recognition.

Third Embodiment

Figure 4:
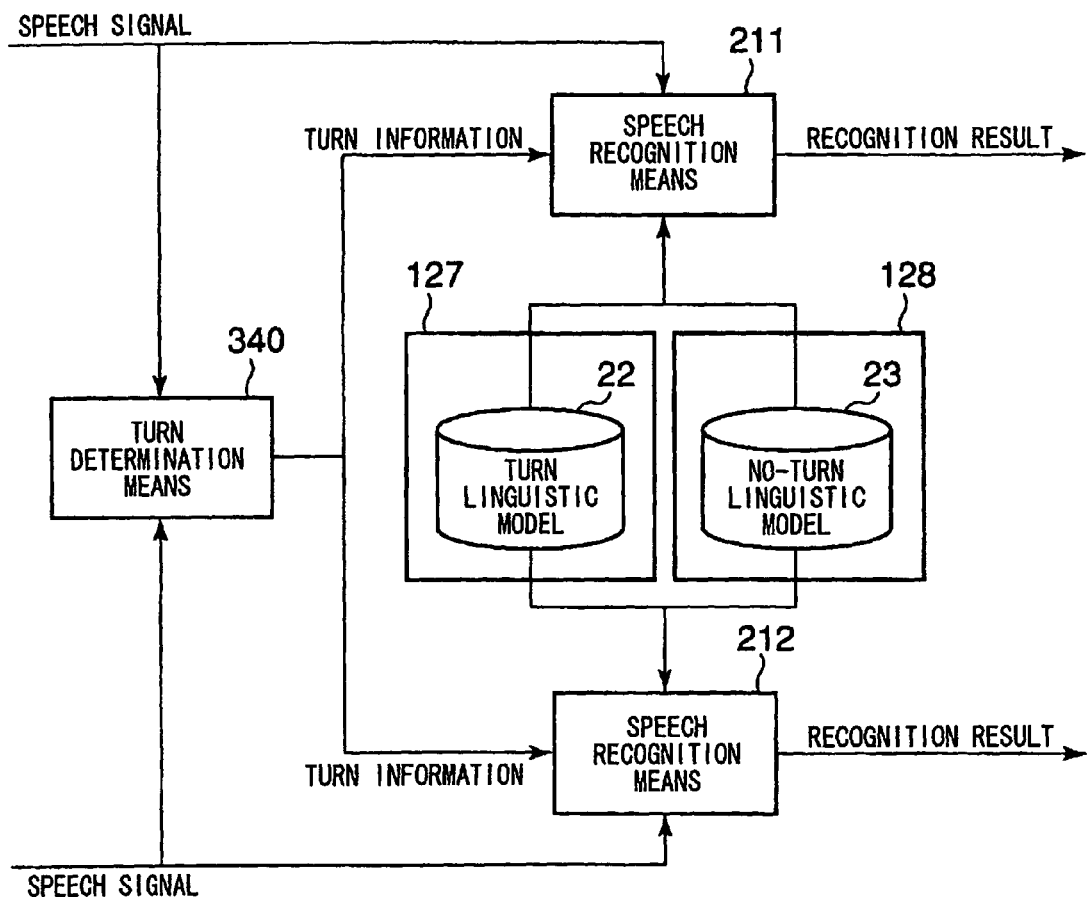
FIG. 4 is a block diagram showing a configuration example of a third embodiment of the present invention.

FIG. 4 is a block diagram showing a configuration example of a third embodiment of the present invention. A dialogue speech recognition system according to the third embodiment includes a first speech recognition means 211, a second speech recognition means 212, a turn linguistic model storage means 127, a no-turn linguistic model storage means 128, and a turn determination means 340. The same elements as in the second embodiment are denoted by the same referential symbols as in FIG. 3, and explanation thereof is omitted.

A speech signal of each speaker is input to the turn determination means 340. Then, the turn determination means 340 generates turn information regarding each speaker and outputs the turn information regarding each speaker to the speech recognition means 211, 212 corresponding to each speaker.

For example, a speech signal of each speaker is input to the turn determination means 340 in synchronization with utterance of each speaker. Then, the turn determination means 340 generates turn information based on the timing of start and end of input of a speech signal by each speaker. Then, the turn determination means 340 transmits the turn information of a first speaker to the first speech recognition means 211 and also transmits the turn information of a second speaker to the second speech recognition means 212.

The operation of each of the speech recognition means 211 and 212 to which the speech signal and the turn information are input is the same as in the second embodiment.

Note that the turn determination means 340 may be included in either speech recognition means, and the turn determination means 340 and the respective means 112 to 115 (cf. FIG. 1) included in the speech recognition means may be implemented by a CPU which operates according to a program.

Further, in the third embodiment, each of the speech recognition means 211 and 212 may hold a turn linguistic model and a no-turn linguistic model.

Figure 5:
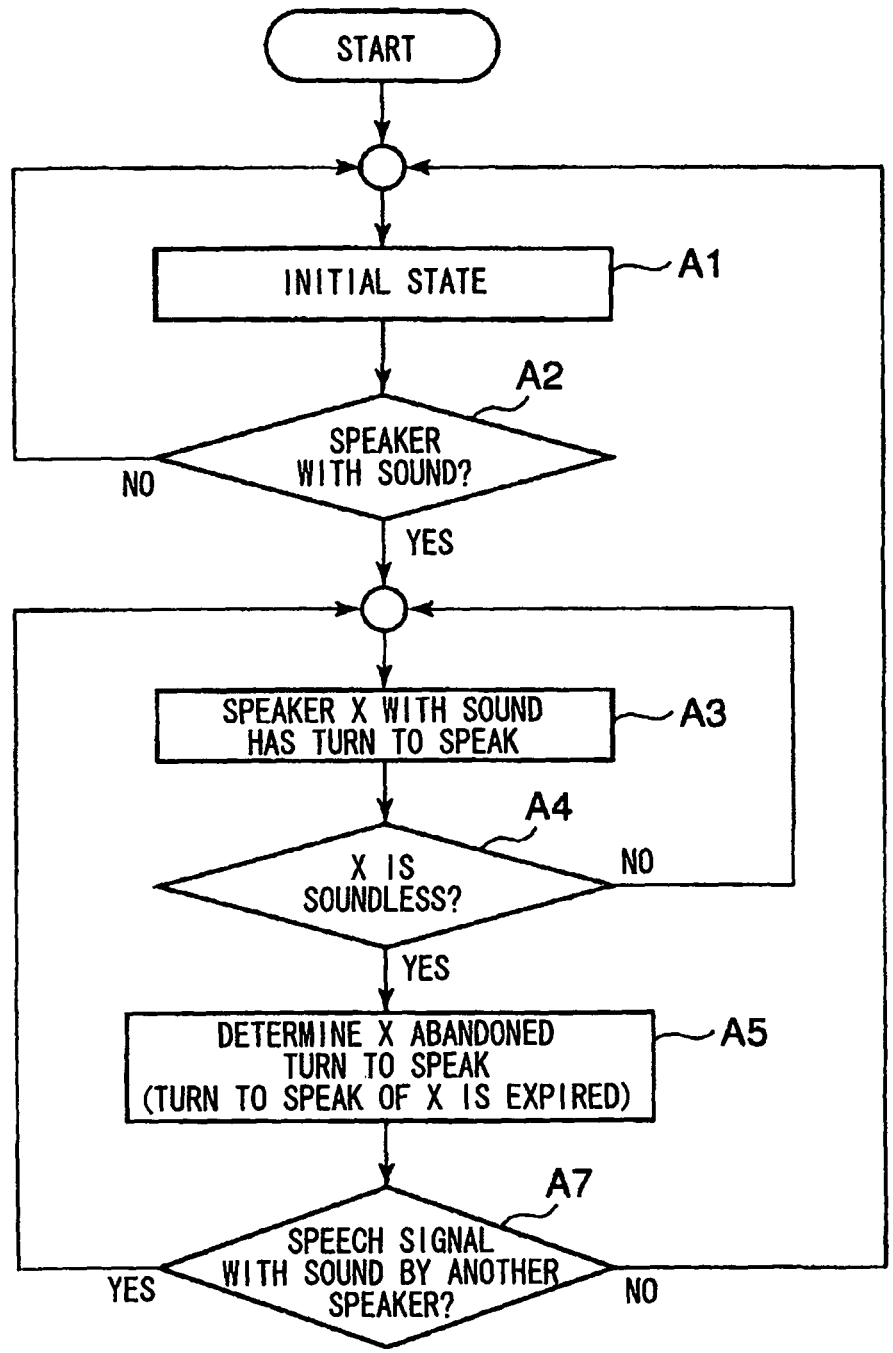
FIG. 5 is a flowchart showing an example of a process of a turn determination means.

The operation of the turn determination means 340 is described next. FIG. 5 is a flowchart showing an example of a process of the turn determination means 340. The turn determination means 340 makes such setting that no speaker has the turn to speak in an initial state (Step A1). Then, the turn determination means 340 identifies whether a speech signal of each speaker is sounded (a state where speech is uttered) or soundless, and determines whether a state has changed from the state where speech signals of all speakers are soundless to the state where a speech signal of any speaker becomes sounded (Step A2).

When it is determined in Step A2 that there is no speech signal that has become sounded, the processing from Step A1 is repeated. When it is determined that a speech signal of any speaker has become sounded from soundless, the turn determination means 340 determines that the speaker who has generated the speech signal as a first turn holder (Step A3). Specifically, if a speaker who has generated the sounded speech signal is X, the speaker X is determined to be a turn holder. Further, after specifying the turn holder, the turn determination means 340 inputs the turn information indicating the presence of the turn to speak to the speech recognition means (which is the first speech recognition means 211 in this example) corresponding to the turn holder and inputs the turn information indicating the absence of the turn to speak to the other speech recognition means 212.

After Step A3, the turn determination means 340 determines whether the speech signal of the turn holder (X) has changed from sounded to soundless (Step A4). When it is still sounded (No in Step A4), the processing from Step A3 is repeated. Specifically, it is determined that the speaker X keeps the turn to speak. When time has elapsed and the speech signal of the turn holder has changed from sounded to soundless at some point of time (Yes in Step A4), the turn determination means 340 considers that the turn to speak of the speaker X has expired, changes the turn information to be transmitted to the first speech recognition means 211 corresponding to the speaker X and transmits the turn information indicating the absence of the turn to speak to the first speech recognition means 211 (Step A5).

Then, the turn determination means 340 determines whether there is a speech signal which is sounded among speech signals of any other speakers (Step A7). If, in Step A7, any of speech signals of other speakers are not identified as being sounded (No in Step A7), the processing from Step A1 is repeated. Further, there is a speech signal which is sounded among speech signals of other speakers (a speaker for whom it is considered that the turn to speak has expired in Step A5) (Yes in Step A7), the processing from Step A3 is repeated by setting a speaker (renewed X) corresponding to the speech signal as the turn holder.

Figure 6:
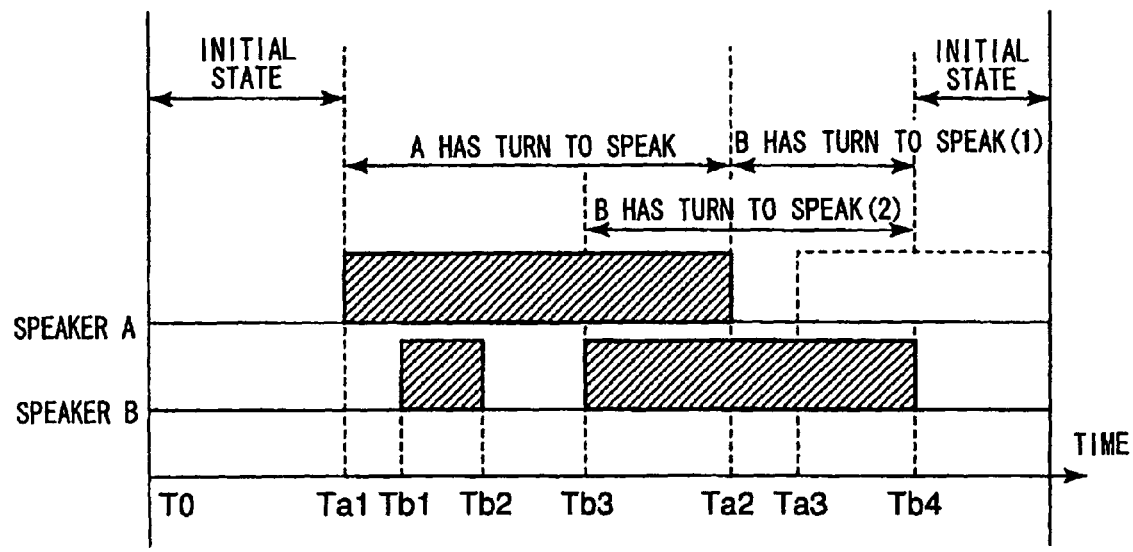
FIG. 6 is an explanatory view showing an example of timing of utterance start and end of a plurality of speakers.

FIG. 6 is an explanatory view showing an example of timing of utterance start and end of a plurality of speakers. In this example, it is assumed that two speakers A and B participate in a dialogue. The horizontal axis of FIG. 6 indicates time, in which a positive direction is to the right side. The symbols such Ta1 and Tb2 shown in FIG. 6 indicate time, and T0, Ta1, Tb1, Tb2, Tb3 and Tb4 are arranged sequentially from the former time. The shaded band-like portion shown in FIG. 6 indicates that a speaker speaks during the period of time. The example shown in FIG. 6 illustrates that the speaker A makes some utterance during Ta1 to Ta2, and the speaker B makes some utterance during Tb1 to Tb2 and Tb3 to Tb4.

The turn determination means 340, when operating according to the flowchart shown in FIG. 5, operates as follows. First, in the interval from time T0 to time Ta1, because the speakers A and B both do not speak, it is determined to be the initial state. Specifically, it is determined that neither speaker has the turn to speak. When the speaker A starts speaking at time Ta1, the turn determination means 340 determines that the speaker A is the first turn holder. Further, although the speaker B speaks something during time Tb1 to Tb2, because the speaker A who already has the turn to speak keeps speaking, the speaker B is not determined as the turn holder during this period. Then, when the speaker A finishes speaking at time Ta2, the turn determination means 340 considers that turn to speak of the speaker A has expired, and changes the content of the turn information input to the speech recognition means corresponding to the speaker A into "no turn to speak". At this time, because the speaker B has already started speaking at time Tb3, the turn to speak is immediately transferred to the speaker B. Specifically, the turn determination means 340 changes the content of the turn information input to the speech recognition means corresponding to the speaker B into "turn to speak". The speaker B keeps having the turn to speak until time Tb4 when the speaker B finishes speaking, and then it returns to the initial state where neither speaker has the turn to speak.

In the case illustrated in FIG. 6, it is clear that the speaker B does not have the turn to speak during the time Tb1 to Tb2 and that the speaker A does not have the turn to speak during the time Ta2 to Tb4. Further, when the processing is executed in accordance with the flowchart shown in FIG. 5, the existence of the next speaker is not determined until time Ta2, and therefore the speaker B does not have the turn to speak in the interval from time Tb3 to time Ta2; however, it may be determined that the speaker B has the turn to speak in the interval from time Tb3 to time Ta2.

Citing the definition of Sacks et al. again, it is described that "in transitions from one turn to next turn, neither gap nor overlap usually occurs, and if any, it is short, and there is a general rule that basically one participant takes one turn and speak", and therefore, if the speaker A has the turn to speak in the interval from time Tb3 to time Ta2, the speaker B does not have the turn to speak during the interval. When following this idea, the processing may be performed according to the algorithm shown in FIG. 5. In this case, the speaker B does not have the turn to speak until the time when it is determined that the speaker B newly has the turn to speak (time Ta2 shown in FIG. 6). In the case of employing the turn determination means 340 which operates in this manner, when learning the no-turn linguistic model 23, it is preferred to learn it as a linguistic model which contains only utterance of any of back-channel, confirmation and request for turn to speak.

Figure 7:
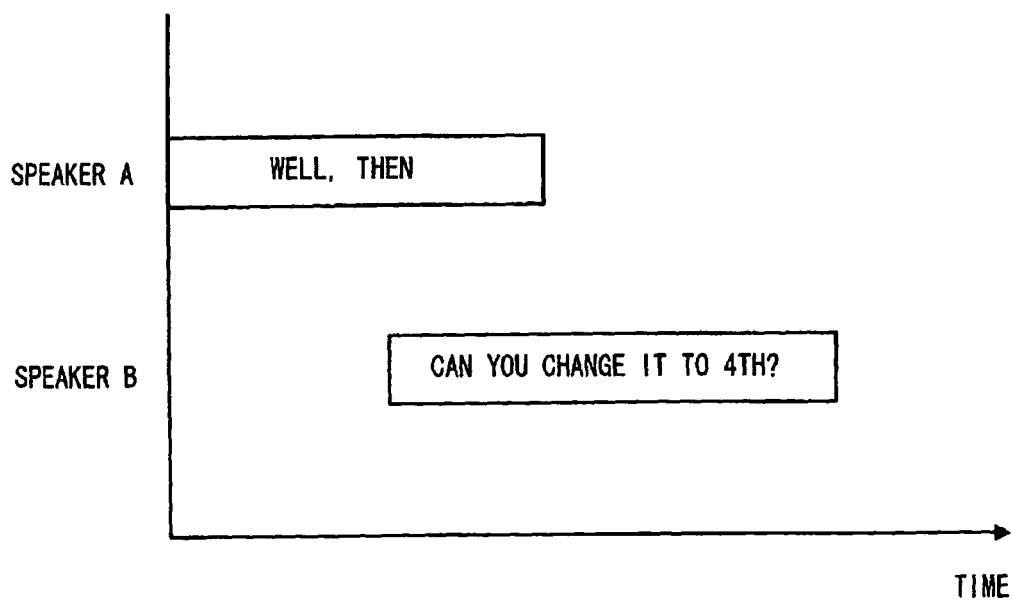
FIG. 7 is an explanatory view showing an example of a dialog including utterance not classified into any of backchannel, confirmation and request for turn to speak.

On the other hand, in an actual speech dialog, a phenomenon which is against the principle of Sacks et al. is observed often. FIG. 7 is an explanatory view showing an example of a dialog including utterance which is not classified into any of back-channel, confirmation and request for turn to speak. The horizontal axis in FIG. 7 also represents a lapse of time, as in FIG. 2, and indicates the timing of utterance of each speaker. The utterance of the speaker B shown in FIG. 7 is not classified into any of back-channel, confirmation and request for turn to speak. As illustrated in FIG. 7, a situation in which a speaker who does not have the turn to speak interrupts the utterance of a speaker who has the turn to speak and takes the turn to speak is observed often. The interval from time Tb3 to time Ta2 shown in FIG. 6 corresponds to this case. In such a case, the utterance of the speaker B from time Tb3 to time Ta2 is difficult to be recognized correctly unless restriction is imposed as being utterance of a speaker who has the turn to speak. Specifically, speech recognition is difficult to be performed correctly unless referring to a linguistic model as utterance of a speaker who has the turn to speak.

In view of this, in the flowchart shown in FIG. 5, when a new turn holder is defined in Step A4, the turn determination means 340 may grant the turn to speak to the turn holder, retroactive to the start time of the current utterance by the speaker. The interval indicated as "B has the turn to speak (2)" in FIG. 6 is the period during which the speaker B has the turn to speak in the case where the speaker B is set to have the turn to speak from the utterance start time Tb3 of the speaker B. In this manner, the turn to speak may be granted to the speaker B retroactive to the utterance start time of the speaker B, so that two speakers have the turn to speak at the same time during time Tb3 to Ta2. Although the operation that grants the turn to speak to a speaker retroactive to the utterance start time is not suitable when performing operation online with an input speech, it can be carried out by performing appropriate delay operation.

Further, when, in Step A4, a certain speaker acquires the turn to speak, and a prescribed short time has elapsed from the end of the immediately previous utterance of the same speaker to the acquisition of the turn to speak, the turn determination means 340 may operate on the assumption that the speaker keeps having the turn to speak during that period. This is described taking FIG. 6 as an example. It is assumed that the speaker A starts speaking again from time Ta3, which is between time Ta2 and Tb4. At this time, when a period from the utterance end time of the speaker A to the time Ta3 is a prescribed time or less, the turn determination means 340 may cancel the turn to speak granted to the speaker B in the interval from time Ta3 (or Ta2) to Tb4 and determine that the turn to speak of the speaker A continues from time Ta1. By determining that the turn to speak continues in this manner, it is possible to avoid that the turn to speak is transferred during a slight pause (soundless interval) inserted by the turn holder for reasons such as breathing.

As described above, a method of automatically determining a turn holder can be devised in various ways.

Further, the turn determination means 340 may output information which indicates the probability that a speaker has the turn to speak in a stochastic manner as the turn information, rather than determining the turn to speak of each speech in a binary manner like "presence" or "absence". For example, in the case that can be determined as "interrupt" illustrated in FIG. 7, there is a possibility that it is not an interrupt, and merely back-channel is uttered late, actually. Thus, the probability that the speaker B has the turn to speak in the interval from time Tb3 to Ta2 shown in FIG. 6 may be set to 50%, and the probability that the one does not have may be set to 50%. Alternatively, both of a score which directs to have the turn to speak and a score which directs not to have the turn to speak are output, and the speech recognition means 211 and 212 may appropriately determine the turn holder. The operation of the speech recognition means in the case where the turn information is not represented by a binary value like 0/1 but represented by probability measures is described earlier in the first embodiment.

Advantageous effects of this embodiment are described.

In this embodiment also, the similar advantageous effects to the first embodiment and the second embodiment can be obtained. Further, in this embodiment, because the turn to speak is determined automatically from input speech, there is no need to place a mechanism for identifying the turn to speak externally.

Further, in the third embodiment, the turn to speak is determined with use only of sounded/soundless determination of a speech signal and time relation of speech signals of respective speakers, it is possible to identify utterance (utterance of a speaker not having the turn to speak) which is expected to have a bias in its content without a limited use scene or an advanced natural language processing operation.

Fourth Embodiment

Figure 8:
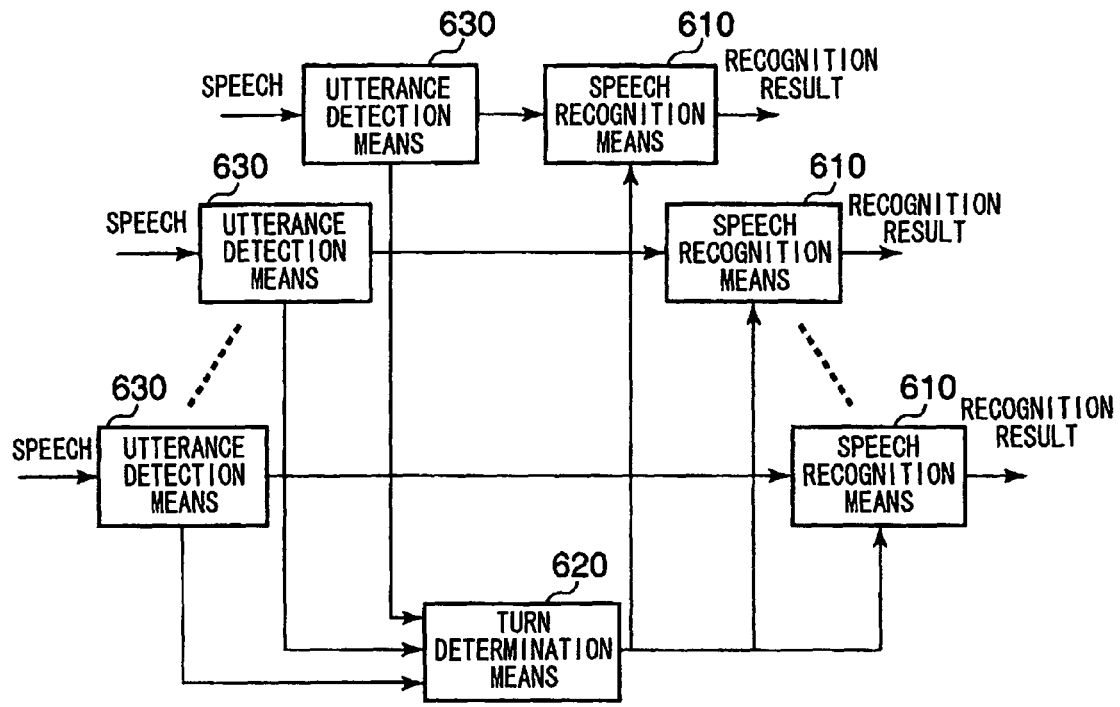
FIG. 8 is a block diagram showing a configuration example of a fourth embodiment of the present invention.

FIG. 8 is a block diagram showing a configuration example of a fourth embodiment of the present invention. A dialogue speech recognition system according to the fourth embodiment includes a plurality of utterance detection means 630, a plurality of speech recognition means 610, and a turn determination means 620. The utterance detection means 630 and the speech recognition means 610 are in one-to-one correspondence, and the corresponding utterance detection means 630 and speech recognition means 610 are paired. Further, a speech signal of a different speaker is input to each utterance detection means 630.

Each speech recognition means 610 is the same as the speech recognition means 110 described in the first embodiment (cf. FIG. 1). Further, the turn determination means 620 is the same as the turn determination means 340 described in the third embodiment (cf. FIG. 4). However, the turn determination means 620 does not need to make sounded/soundless determination.

The utterance detection means 630 analyzes speech by a predetermined algorithm and finds an interval during which a speaker actually speaks. This processing is generally called VAD (Voice Activity Detection) or utterance detection, and various techniques are known. Because a feature quantity which is similar to the one used in the speech recognition means 610 in the subsequent stage is often used for a criterion of the utterance detection, the utterance detection processing and the feature quantity extraction processing may be performed simultaneously.

The operation of the fourth embodiment is described hereinbelow.

Each of the utterance detection means 630 inputs a speech signal or its feature amount in an interval during which utterance is actually made from a speech signal of each channel to the corresponding speech recognition means 610. Further, each of the utterance detection means 630 inputs the speech signal or the feature amount, together with time information of the time when the utterance is detected, to the turn determination means 620.

The turn determination means 620 determines whether a speaker who has made utterance has the turn to speak at the time when the utterance is made from the input speech signal or the feature amount, just like the turn determination means 340 in the third embodiment (cf. FIG. 4). Note that, the operation in the case where three or more speakers exist is described later. The turn determination means 620 inputs turn information, which is a result of determining the presence or absence of the turn to speak for each channel, to the speech recognition means 610 in the subsequence stage.

The speech recognition means 610 performs speech recognition processing by switching appropriate linguistic conditions according to the presence or absence of the turn to speak indicated by the input turn information, and outputs a recognition result for each channel, just like the speech recognition means 110 in the first embodiment (cf. FIG. 1). Specifically, the speech recognition means 610 performs speech recognition processing by switching between the turn linguistic model and the no-turn linguistic model according to the presence or absence of the turn to speak.

An example of the operation in the case where the turn determination means 620 automatically determines the turn to speak from speech of three or more channels is described hereinbelow.

Figure 9:
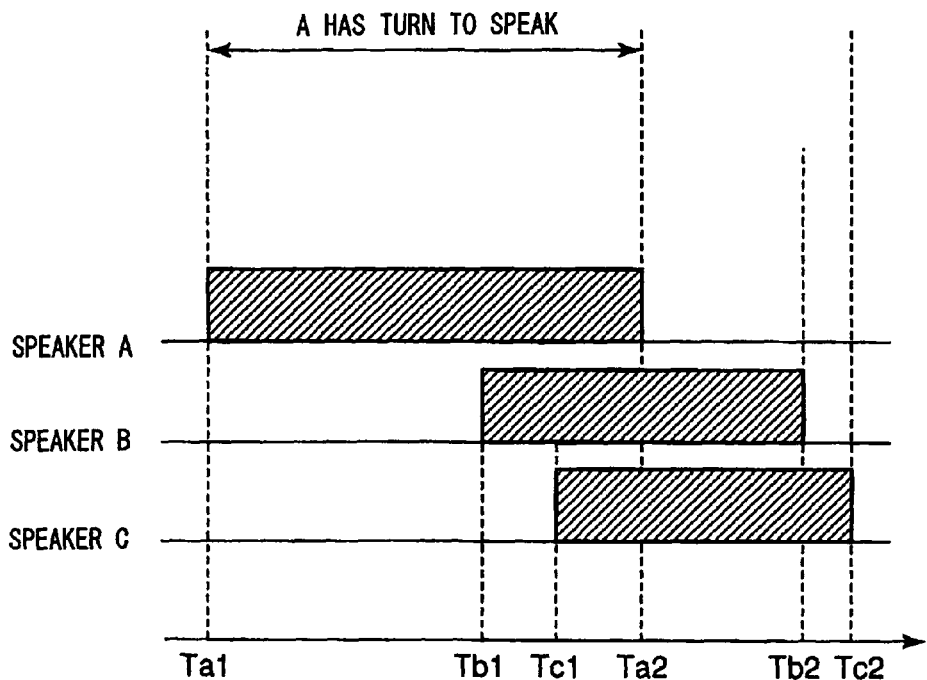
FIG. 9 is an explanatory view showing an example of a situation of a dialog among three speakers.

FIG. 9 is an explanatory view showing an example of a situation of a dialog in which three speakers A, B and C participate. It is assumed that the speaker A makes utterance from time Ta1 to Ta2, the speaker B makes utterance from time Tb1 to Tb2, and the speaker C makes utterance from time Tc1 to Tc2. The right side of the horizontal axis shown in FIG. 9 is the positive direction, and the time is arranged in order of Ta1, Tb1, Tc1, Ta2, Tb2 and Tc2.

If the turn determination means 620 operates according to the algorithm shown in FIG. 5 which is described in the third embodiment, it is determined that the speaker A who has started speaking first after the initial state becomes a turn holder at time Ta1 (cf. Steps A1 to A3 in FIG. 5). Then, the turn determination means 620 determines that the turn to speak of the speaker A has expired at time Ta2 (cf. Step A5 in FIG. 5). In the following Step A7, it is determined that there is a sounded speech signal, and further a turn holder is determined in Step A3; however, the speakers B and C have already started speaking at time Ta2 when the speaker A finishes speaking. In this case, the turn determination means 620 may determine the next turn holder in the following manner.

For example, among other speakers who have started utterance at the end of the utterance of the speaker A who has had the turn to speak, a speaker with the longest utterance duration at the end of the utterance of the speaker A may be regarded as a turn holder. In the example of FIG. 9, although the speakers B and C both have already started speaking at time Ta2 when the speaker A finishes speaking, because the speaker B started speaking at time Tb1, which is earlier than the speaker C, the speaker B may be determined as a turn holder.

Further, the turn determination means 620 may regard a speaker who continues utterance for the longest time after the end of the utterance of the speaker A who has had the turn to speak as a turn holder. In this case, in the example shown in FIG. 9, after the time Ta2 when the speaker A finished speaking, the speaker C continues speaking until time Tc2 after the speaker B has finished speaking, and therefore the speaker C may be determined as a turn holder.

Alternatively, assuming that the speakers B and C equally have a possibility of having the turn to speak, it may be determined that the probability that the speaker B has the turn to speak is 50%, and the probability that the speaker C has the turn to speak is 50%.

Further, by combining those methods, the possibility of having the turn to speak may vary among speakers. For example, based on that the interval from time Tb1 to Ta2 is longer by 10% than the interval from time Tb2 to Tc2, it may be determined that the probability that the speaker B has the turn to speak is 55%, and the probability that the speaker C has the turn to speak is 45%.

Advantageous effects of this embodiment are described.

In this embodiment, even in a speech dialog in which three or more speakers participate, speech recognition accuracy can be improved by using a linguistic condition based on the turn to speak (the turn linguistic model and the no-turn linguistic model).

Further, in this embodiment, the turn determination is made after the utterance detection means 630 makes utterance detection, the turn determination means 620 does not need to make sounded/soundless determination. Thus, the turn determination means 620 can be implemented more simply. The speech recognition means 610 can be also simplified, and because only speech of an utterance interval is exchanged, the amount of data transferred between the respective means can be reduced. In addition, if the utterance detection means 630 performs feature amount extraction (one of the functions of the acoustic likelihood calculation means 112 shown in FIG. 1), the feature amount extraction processing is not performed redundantly between the utterance detection means 630 and the speech recognition means 610, which prevents an increase in necessary calculation time.

EXAMPLE

Figure 10:
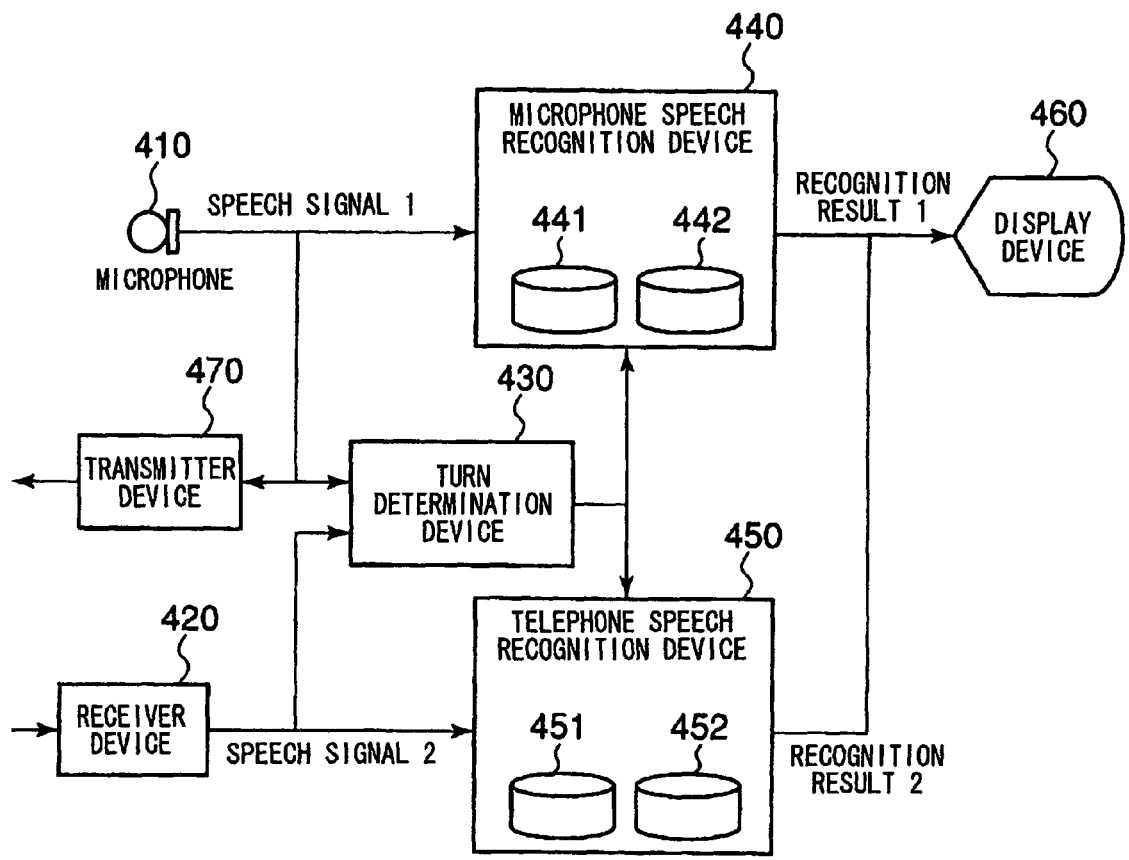
FIG. 10 is a block diagram showing an example of the present invention.

An example of the present invention is described hereinbelow. FIG. 10 is a block diagram showing an example of the present invention. FIG. 10 illustrates the case where the dialogue speech recognition system is a telephone answering speech recognition system which performs speech recognition of a telephone dialogue. The dialogue speech recognition system (which is referred to hereinafter as the telephone answering speech recognition system) illustrated in FIG. 10 includes a microphone 410, a receiver device 420, a turn determination device 430, a first speech recognition device 440, a second speech recognition device 450, a display device 460 that displays a speech recognition result, and a transmitter device 470.

The microphone 410 and the receiver device 420 are a microphone and a receiver device of a telephone set, and the telephone answering speech recognition system performs speech recognition of speech of a speaker (hereinafter referred to as a first speaker) who inputs speech to the microphone 410 and another speaker (hereinafter referred to as a second speaker) who dialogues with the first speaker by using another telephone set through a telephone line.

The turn determination device 430 operates in the same manner as the turn determination means 340 in the third embodiment.

The first speech recognition device 440 and the second speech recognition device 450 both have the same configuration as the speech recognition means 110 in the first embodiment (cf. FIG. 1) and operate in the same manner as the speech recognition means 110. Note that the illustration of the elements such as the acoustic likelihood calculation means 112 is omitted, and the turn linguistic model and the no-turn linguistic model are shown schematically.

The first speech recognition device 440 stores a turn linguistic model 441 and a no-turn linguistic model 442. The turn linguistic model 441 is a linguistic model which is specialized to the content uttered when the first speaker has the turn to speak, and the no-turn linguistic model 442 is a linguistic model which is specialized to the content uttered when the first speaker does not have the turn to speak. Likewise, the second speech recognition device 450 stores a turn linguistic model 451 which is specialized to the content uttered when the second speaker has the turn to speak and a no-turn linguistic model 452 which is specialized to the content uttered when the second speaker does not have the turn to speak. Thus, four kinds of linguistic models are prepared in the system as a whole, and recognition processing is performed by combining them according to a speaker and whether the speaker speaks with the turn to speak at a certain time.

The first speech recognition device 440 performs speech recognition of speech of the first speaker input from the microphone 410, and the second speech recognition device 450 performs speech recognition of speech of the second speaker who dialogues with the first speaker through a telephone line. Hereinafter, the first speech recognition device 440 is referred to as a microphone speech determination device, and the second speech recognition device 450 is referred to as a telephone speech recognition device.

The microphone 410 receives the speech of the first speaker, performs A-D conversion of the speech signal of the first speaker, and inputs a digital speech signal of the first speaker to the microphone speech determination device 440. At the same time, the microphone 410 inputs the speech signal of the first speaker also to the turn determination device 430. Further, the microphone 410 inputs the speech signal of the first speaker to the transmitter device 470 of the telephone set on which the microphone 410 is mounted. The transmitter device 470 transmits the speech signal of the first speaker to the telephone set of the second speaker through the telephone line.

The receiver device 420 receives the speech signal of the second speaker through the telephone line, and inputs the speech signal of the second speaker as a digital speech signal to the telephone speech recognition device 450. At the same time, the receiver device 420 inputs the speech signal of the second speaker also to the turn determination device 430.

The receiver device 420 may be hardware to which an analog signal is input through a telephone line (analog exchange network) and captures it as a digital signal. Further, the receiver device 420 may operate according to a program for appropriately decoding a digital signal which has reached through a computer network to which VoIP (Voice over IP) or the like is applied and extracting them as a digital signal.

Further, although the microphone 410 may be a handset of an analog telephone set, it is necessary to have a structure that at least separates the speech signal of the first speaker and the speech signal of the second speaker obtained by the receiver device 420.

The turn determination device 430 analyzes the two input speech signals using a prescribed algorithm and estimates which of the first speaker and the second speaker is likely to have the turn to speak as a probability value with respect to each given length of time (e.g. 100 msec). The turn determination device 430 inputs the turn information indicating the probability that the first speaker has the turn to speak to the microphone speech recognition device 440, and inputs the turn information indicating the probability that the second speaker has the turn to speak to the telephone speech recognition device 450.

To the microphone speech recognition device 440, the speech signal of the first speaker is input from the microphone 410, and the turn information regarding the speech signal at that time is input from the turn determination device 430. When calculating a linguistic likelihood by the speech recognition process, the microphone speech recognition device 440 acquires linguistic likelihoods from both of the turn linguistic model 441 and the no-turn linguistic model 442, calculates a weighted sum of the two linguistic likelihoods by using the probability of the presence or absence of the turn to speak which is input from the turn determination device 430 as weights, and then derives a speech recognition result by using it as a final linguistic likelihood.

Likewise, to the telephone speech recognition device 450, the speech signal of the second speaker is input from the receiver device 420, and the turn information regarding the speech signal at that time is input from the turn determination device 430. Then, the telephone speech recognition device 450, just like the microphone speech recognition device 440, acquires linguistic likelihoods from both of the turn linguistic model 451 and the no-turn linguistic model 452, calculates a weighted sum of the two linguistic likelihoods by using the probability of the presence or absence of the turn to speak which is input from the turn determination device 430 as weights, and then derives a speech recognition result by using it as a final linguistic likelihood.

The microphone speech recognition device 440 and the telephone speech recognition device 450 format the speech recognition result into text and make it displayed on the display device 460.

Figure 11:
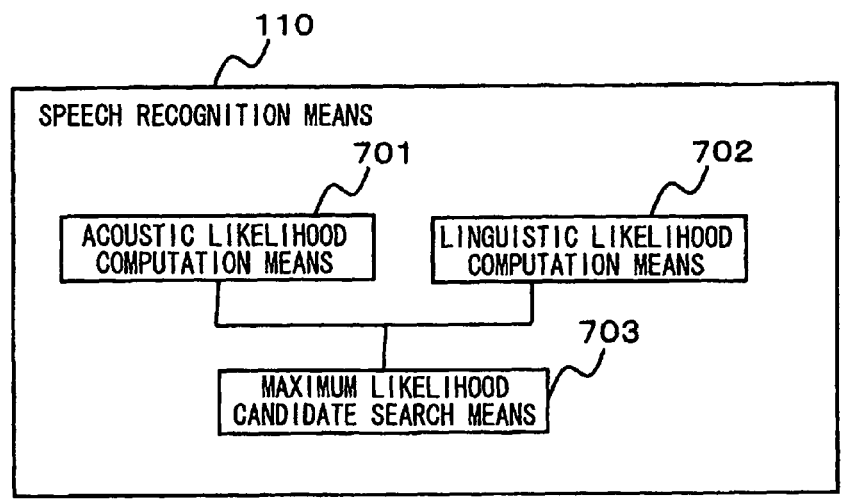
FIG. 11 is a block diagram showing an overview of the present invention.

The overview of the present invention is described hereinbelow. FIG. 11 is a block diagram showing the overview of the present invention. The dialogue speech recognition system according to the present invention includes the speech recognition means 110 to which a speech signal of each speaker in a dialog among a plurality of speakers and turn information indicating whether a speaker who has generated the speech signal has turn to speak or indicating a probability that the speaker has turn to speak is input, and which performs speech recognition for the speech signal.

The speech recognition means 110 at least includes an acoustic likelihood computation means 701 (e.g. the acoustic likelihood calculation means 112), a linguistic likelihood computation means 702 (e.g. the turn linguistic likelihood calculation means 113 and the no-turn linguistic likelihood calculation means 114), and a maximum likelihood candidate search means 703 (e.g. the maximum likelihood hypothesis search means 115). The acoustic likelihood computation means 701 provides a likelihood of occurrence of an input speech signal from a given phoneme sequence. The linguistic likelihood computation means 702 provides a likelihood of occurrence of a given word sequence. The maximum likelihood candidate search means 703 provides a word sequence with a maximum likelihood of occurrence from a speech signal by using the likelihoods provided by the acoustic likelihood computation means 701 and the linguistic likelihood computation means 702. Further, the linguistic likelihood computation means 702 provides different linguistic likelihoods between when a speaker who has generated the speech signal input to the speech recognition means 110 has the turn to speak and when not.

In this configuration, with utilization of the turn to speak, which is a universal concept in a dialogue, speech recognition is performed using the condition where a speaker has the turn to speak and the condition where a speaker does not have the turn to speak, and it is thus applicable to dialogs in various fields.

Further, the above embodiment discloses a configuration in which the linguistic likelihood computation means 702 includes a first linguistic likelihood identification means (e.g. the turn linguistic likelihood calculation means 113) that specifies a likelihood from a first linguistic model (e.g. the turn linguistic model) indicating a linguistic likelihood when a speaker who has generated the speech signal has the turn to speak, and a second linguistic likelihood identification means (e.g. the no-turn linguistic likelihood calculation means 114) that specifies a likelihood from a second linguistic model (e.g. the no-turn linguistic model) indicating a linguistic likelihood when a speaker who has generated the speech signal does not have the turn to speak, and the maximum likelihood candidate search means 703 acquires a candidate for a speech recognition result by using at least one of a linguistic likelihood identified by the first linguistic likelihood identification means and a linguistic likelihood identified by the second linguistic likelihood identification means according to the turn information.

Further, the above embodiment discloses a configuration in which the maximum likelihood candidate search means 703 corrects and merges the linguistic likelihood identified by the first linguistic likelihood identification means and the linguistic likelihood identified by the second linguistic likelihood identification means for a phoneme sequence converted from the speech signal according to the turn information, and acquires a candidate for a speech recognition result by using the merged maximum likelihood.

Further, the above embodiment discloses a configuration in which the maximum likelihood candidate search means 703 linearly combines the linguistic likelihood identified by the first linguistic likelihood identification means and the linguistic likelihood identified by the second linguistic likelihood identification means for a phoneme sequence converted from the speech signal according to the turn information, and acquires a candidate for a speech recognition result from the speech signal by using the linearly combined maximum likelihood.

Further, the above embodiment discloses a configuration in which, when performing speech recognition of a speech signal of a speaker who does not have the turn to speak, the maximum likelihood candidate search means 703 corrects a linguistic likelihood of a character sequence corresponding to a speech recognition result for speech of a speaker who is determined to have the turn to speak at a most recent time, among the linguistic likelihood identified by the second linguistic likelihood identification means. In this configuration, accuracy of speech recognition can be improved by utilization of a property that confirmation utterance is made when not having the turn to speak, and a part of the content of the most recent utterance of a turn holder is repeated at the time of confirmation.

Further, the first linguistic model and the second linguistic model are linguistic models that define a linguistic likelihood of a word, a set of words, or a chain of words or sets of words corresponding to a phoneme sequence, for example.

Further, the above embodiment discloses a configuration that includes a turn information generation means (e.g. the turn determination means 340) that generates turn information based on start time and end time of a speech signal of each speaker. In this configuration, there is no need to mount a mechanism for identifying the turn to speak externally to the dialogue speech recognition system.

Further, the above embodiment discloses a configuration in which the turn information generation means generates turn information indicating that a certain speaker has the turn to speak during a period from time when a speech signal of the speaker becomes sounded from a state where speech signals of all speakers are soundless to time when the speech signal of the speaker becomes soundless, and, provided that a speech signal of another speaker has become sounded at the time when the speech signal of the speaker who is set to have the turn to speak becomes soundless, generates turn information indicating that said another speaker has the turn to speak during a period from the time to time when the speech signal of said another speaker becomes soundless.

Further, the above embodiment discloses a configuration in which the turn information generation means generates turn information indicating that a certain speaker has the turn to speak during a period from time when a speech signal of the speaker becomes sounded from a state where speech signals of all speakers are soundless to time when the speech signal of the speaker becomes soundless, and, provided that a speech signal of another speaker has become sounded at the time when the speech signal of the speaker who is set to have the turn to speak becomes soundless, generates turn information indicating that said another speaker has the turn to speak during a period from the time when the speech signal of the speaker becomes sounded to time when the speech signal of said another speaker becomes soundless.

While the invention has been particularly shown and described with reference to embodiments thereof, the invention is not limited to these embodiments. Various changes and modifications in form and details as would be obvious to one skilled in the art may be made therein without departing from the spirit and scope of the present invention as defined by the claims.

This application is based upon and claims the benefit of priority from Japanese patent application No. 2008-193755, filed on Jul. 28, 2008, the disclosure of which is incorporated herein in its entirety by reference.

INDUSTRIAL APPLICABILITY

The present invention may be applied to a minutes creation system that performs speech recognition of a conference in which a plurality of speakers participate. Further, it is also applicable to a telephone answering speech recognition system that performs speech recognition of a telephone answering voice or a telephone answering support system based on the speech recognition which are used in a contact center or a telephone consultation service desk. Furthermore, it is also applicable to a presentation aid system which is used when converting questions and answers in a lecture or presentation, interview speech between a doctor and a patient or the like and presenting a knowledge base or a reference material. It is particularly effective for application to a speech recognition system which is used in the case where a reaction of a speaker who does not have the turn to speak is important (for example, a system that analyzes a reaction of a customer in a contact center, a reaction of a patient in an interview or the like).

REFERENCE SIGNS LIST 22, 441, 451 TURN LINGUISTIC MODEL
23, 442, 452 NO-TURN LINGUISTIC MODEL
110, 211, 212, 610 SPEECH RECOGNITION MEANS
112, 710 ACOUSTIC LIKELIHOOD CALCULATION MEANS
113 TURN LINGUISTIC LIKELIHOOD CALCULATION MEANS
114 NO-TURN LINGUISTIC LIKELIHOOD CALCULATION MEANS
115 MAXIMUM LIKELIHOOD HYPOTHESIS SEARCH MEANS
116, 127 TURN LINGUISTIC MODEL STORAGE MEANS
117, 128 NO-TURN LINGUISTIC MODEL STORAGE MEANS
340, 620, 430 TURN DETERMINATION MEANS
410 MICROPHONE
420 RECEIVER DEVICE
440 MICROPHONE SPEECH RECOGNITION DEVICE
450 TELEPHONE SPEECH RECOGNITION DEVICE
460 DISPLAY DEVICE
470 TRANSMITTER DEVICE
630 UTTERANCE DETECTION MEANS
702 LINGUISTIC LIKELIHOOD COMPUTATION MEANS
703 MAXIMUM LIKELIHOOD CANDIDATE SEARCH MEANS

The invention claimed is:

1. A dialogue speech recognition system comprising:
a speech recognition unit, implemented by at least one central processing unit (CPU), that receives a speech signal of each speaker in a dialog among a plurality of speakers and turn information indicating whether a speaker having generated the speech signal has turn to speak or indicating a probability that the speaker has turn to speak and performs speech recognition for the speech signal, wherein
the speech recognition unit at least includes:
an acoustic likelihood computation unit that provides a likelihood of occurrence of an input speech signal from a given phoneme sequence;
a linguistic likelihood computation unit that provides a likelihood of occurrence of a given word sequence; and
a maximum likelihood candidate search unit that provides a word sequence with a maximum likelihood of occurrence from a speech signal by using the likelihoods provided by the acoustic likelihood computation nit and the linguistic likelihood computation unit, and
the linguistic likelihood computation unit provides different linguistic likelihoods when a speaker having generated a speech signal input to the speech recognition unit has the turn to speak and when not.

2. The dialogue speech recognition system according to claim 1, wherein
the linguistic likelihood computation unit includes:
a first linguistic likelihood identification unit that identifies a likelihood from a first linguistic model indicating a linguistic likelihood when a speaker having generated a speech signal has the turn to speak; and a second linguistic likelihood identification unit that identifies a likelihood from a second linguistic model indicating a linguistic likelihood when a speaker having generated a speech signal does not have the turn to speak, and the maximum likelihood candidate search unit acquires a candidate for a speech recognition result by using at least one of a linguistic likelihood identified by the first linguistic likelihood identification unit and a linguistic likelihood identified by the second linguistic likelihood identification unit according to the turn information.

3. The dialogue speech recognition system according to claim 2, wherein the maximum likelihood candidate search unit corrects and the merges the linguistic likelihood identified by the first linguistic likelihood identification unit and the linguistic likelihood identified by the second linguistic likelihood identification unit according to the turn information, and acquires a candidate for a speech recognition result by using the merged maximum likelihood.

4. The dialogue speech recognition system according to claim 2, wherein the maximum likelihood candidate search unit linearly combines the linguistic likelihood identified by the first linguistic likelihood identification unit and the linguistic likelihood identified by the second linguistic likelihood identification unit according to the turn information, and acquires a candidate for a speech recognition result from the speech signal by using the linearly combined maximum likelihood.

5. The dialogue speech recognition system according to claim 2, wherein, when performing speech recognition of a speech signal of a speaker not having the turn to speak, the maximum likelihood candidate search unit corrects a linguistic likelihood of a character sequence corresponding to a speech recognition result for speech of a speaker determined to have the turn to speak at a most recent time, among the linguistic likelihood identified by the second linguistic likelihood identification unit.

6. The dialogue speech recognition system according to claim 2, wherein the first linguistic model and the second linguistic model define a linguistic likelihood of a word, a set of words, or a chain of words or sets of words corresponding to a phoneme sequence.

7. The dialogue speech recognition system according to claim 1, further comprising:

a turn information generation unit, implemented by the at least one CPU, that generates turn information based on start time and end time of a speech signal of each speaker.

8. The dialogue speech recognition system according to claim 7, wherein the turn information generation unit generates turn information indicating that a certain speaker has the turn to speak during a period from time when a speech signal of the speaker becomes sounded from a state where speech signals of all speakers are soundless to time when the speech signal of the speaker becomes soundless, and, provided that a speech signal of another speaker has become sounded at the time when the speech signal of the speaker set to have the turn to speak becomes soundless, generates turn information indicating that said another speaker has the turn to speak during a period from the time to time when the speech signal of said another speaker becomes soundless.

9. The dialogue speech recognition system according to claim 7, wherein the turn information generation unit generates turn information indicating that a certain speaker has the turn to speak during a period from time when a speech signal of the speaker becomes sounded from a state where speech signals of all speakers are soundless to time when the speech signal of the speaker becomes soundless, and, provided that a speech signal of another speaker has become sounded at the time when the speech signal of the speaker set to have the turn to speak becomes soundless, generates turn information indicating that said another speaker has the turn to speak during a period from the time when the speech signal of the speaker becomes sounded to time when the speech signal of said another speaker becomes soundless.

10. A dialogue speech recognition method comprising:

upon receiving a speech signal of each speaker in a dialog among a plurality of speakers and turn information indicating whether a speaker having generated the speech signal has turn to speak or indicating a probability that the speaker has turn to speak, performing, by at least one central speech recognition for the speech signal;

at time of the speech recognition, performing acoustic likelihood computation that provides a likelihood of occurrence of an input speech signal from a given phoneme sequence;

performing linguistic likelihood computation that provides a likelihood of occurrence of a given word sequence;

performing maximum likelihood candidate search that provides a word sequence with a maximum likelihood of occurrence from a speech signal by using the likelihoods provided by the acoustic likelihood computation and the linguistic likelihood computation; and at time of the linguistic likelihood computation, providing different linguistic likelihoods when a speaker having generated an input speech signal has the turn to speak and when not.

11. The dialogue speech recognition method according to claim 10, comprising, at time of the linguistic likelihood computation, performing first linguistic likelihood identification that identifies a likelihood from a first linguistic model indicating a linguistic likelihood when a speaker having generated a speech signal has the turn to speak;

performing second linguistic likelihood identification that identifies a likelihood from a second linguistic model indicating a linguistic likelihood when a speaker having generated a speech signal does not have the turn to speak; and at time of the maximum likelihood candidate search, acquiring a candidate for a speech recognition result by using at least one of a linguistic likelihood identified by the first linguistic likelihood identification and a linguistic likelihood identified by the second linguistic likelihood identification according to the turn information.

12. A non-transitory computer readable storage medium for storing a dialogue speech recognition program that causes a computer to execute speech recognition processing that, upon receiving a speech signal of each speaker in a dialog among a plurality of speakers and turn information indicating whether a speaker having generated the speech signal has turn to speak or indicating a probability that the speaker has turn to speak, performs speech recognition for the speech signal, wherein the speech recognition processing at least includes:

acoustic likelihood computation processing that provides a likelihood of occurrence of an input speech signal from a given phoneme sequence;

linguistic likelihood computation processing that provides a likelihood of occurrence of a given word sequence; and maximum likelihood candidate search processing that provides a word sequence with a maximum likelihood of occurrence from a speech signal by using the likelihoods provided by the acoustic likelihood computation processing and the linguistic likelihood computation processing, and the linguistic likelihood computation processing provides different linguistic likelihoods when a speaker having generated the speech signal input to the speech recognition unit has the turn to speak and when not.

13. The non-transitory computer readable storage medium for storing the dialogue speech recognition program according to claim 12, wherein the program causes a computer to execute in the linguistic likelihood processing, first linguistic likelihood identification processing that identifies a likelihood from a first linguistic model indicating a linguistic likelihood when a speaker having generated the speech signal has the turn to speak, and second linguistic likelihood identification processing that identifies a likelihood from a second linguistic model indicating a linguistic likelihood when a speaker having generated the speech signal does not have the turn to speak, and in the maximum likelihood candidate search processing, to acquire a candidate for a speech recognition result by using at least one of a linguistic likelihood identified by the first linguistic likelihood identification processing and a linguistic likelihood identified by the second linguistic likelihood identification processing according to the turn information.

\* \* \* \* \*